United States Patent
Nakai et al.

(10) Patent No.: US 12,479,981 B2
(45) Date of Patent: Nov. 25, 2025

(54) BINDER COMPOSITION FOR ELECTROCHEMICAL DEVICE, CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

(71) Applicant: ZEON CORPORATION, Tokyo (JP)

(72) Inventors: Akito Nakai, Tokyo (JP); Naoki Takahashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 18/566,762

(22) PCT Filed: Jun. 16, 2022

(86) PCT No.: PCT/JP2022/024213
§ 371 (c)(1),
(2) Date: Dec. 4, 2023

(87) PCT Pub. No.: WO2023/276709
PCT Pub. Date: Jan. 5, 2023

(65) Prior Publication Data
US 2024/0279442 A1    Aug. 22, 2024

(30) Foreign Application Priority Data
Jun. 30, 2021 (JP) ................. 2021-109693

(51) Int. Cl.
C08L 9/02      (2006.01)
C08F 220/28    (2006.01)
C08F 236/12    (2006.01)
C08K 7/06      (2006.01)
C08L 33/14     (2006.01)
H01M 4/62      (2006.01)

(52) U.S. Cl.
CPC ............ C08L 9/02 (2013.01); C08F 220/286 (2020.02); C08F 236/12 (2013.01); C08K 7/06 (2013.01); C08L 33/14 (2013.01); H01M 4/623 (2013.01); C08K 2201/001 (2013.01)

(58) Field of Classification Search
None
See application file for complete search history.

(56) References Cited

U.S. PATENT DOCUMENTS 7,262,244 B2      8/2007   Guerin
2013/0330622 A1  12/2013   Sasaki
2020/0235373 A1   7/2020   Tanaka et al.

FOREIGN PATENT DOCUMENTS

| CN | 111129592 A | * | 5/2020 | ........ H01M 10/0525 |
|---|---|---|---|---|
| EP | 3678225 A1 | | 7/2020 | |
| JP | 2007234277 A | | 9/2007 | |
| JP | 4509792 B2 | | 7/2010 | |
| JP | 2011076824 A | | 4/2011 | |
| JP | 2012204303 A | | 10/2012 | |
| JP | 2016021390 A | | 2/2016 | |
| JP | 2017027856 A | | 2/2017 | |
| JP | 2018523281 | * | 8/2018 | ............. H01M 4/62 |
| WO | 2012115096 A1 | | 8/2012 | |
| WO | 2019044909 A1 | | 3/2019 | |

OTHER PUBLICATIONS

Dec. 14, 2023, International Preliminary Report on Patentability issued in the International Patent Application No. PCT/JP2022/024213.
Aug. 9, 2022, International Search Report issued in the International Patent Application No. PCT/JP2022/024213.
Aug. 7, 2025, the Extended European Search Report issued by the European Patent Office in the corresponding European Patent Application No. 22832859.7.

* cited by examiner

Primary Examiner — Khanh T Nguyen
(74) Attorney, Agent, or Firm — KENJA IP LAW PC

(57) ABSTRACT

Provided is a binder composition that is capable of producing a conductive material dispersion liquid having excellent dispersibility and that can cause an electrochemical device to display excellent cycle characteristics. The binder composition contains a first polymer, a second polymer, and an organic solvent. The first polymer includes a nitrile group-containing monomer unit and includes either or both of an aliphatic conjugated diene monomer unit and an alkylene structural unit. The second polymer includes a structural unit of the following formula (I) in a proportion of 70 mass % to 95 mass %. In formula (I), $R^1$ represents a hydrogen atom or a methyl group, $R^2$ represents a hydrogen atom, a phenyl group, an alkyl group having a carbon number of 1 to 6, or a phenyl group including one to three alkyl groups having a carbon number of 1 to 6, and n represents an integer of 3 or more.

(I)

14 Claims, No Drawings

BINDER COMPOSITION FOR ELECTROCHEMICAL DEVICE, CONDUCTIVE MATERIAL DISPERSION LIQUID FOR ELECTROCHEMICAL DEVICE, SLURRY FOR ELECTROCHEMICAL DEVICE ELECTRODE, ELECTRODE FOR ELECTROCHEMICAL DEVICE, AND ELECTROCHEMICAL DEVICE

TECHNICAL FIELD

The present disclosure relates to a binder composition for an electrochemical device, a conductive material dispersion liquid for an electrochemical device, a slurry for an electrochemical device electrode, an electrode for an electrochemical device, and an electrochemical device.

BACKGROUND

Electrochemical devices such as lithium ion secondary batteries, lithium ion capacitors, and electric double-layer capacitors have characteristics such as compact size, light weight, high energy-density, and the ability to be repeatedly charged and discharged, and are used in a wide variety of applications. Consequently, in recent years, studies have been made to improve battery members such as electrodes with the aim of achieving even higher electrochemical device performance.

An electrode used in an electrochemical device typically includes a current collector and an electrode mixed material layer formed on the current collector. The electrode mixed material layer is formed by, for example, applying a slurry for an electrode containing an electrode active material, a binder-containing binder composition, and so forth onto a current collector, and then drying the applied slurry for an electrode.

In recent years, studies have been made with the aim of improving electrochemical device performance through the use of polymers such as acrylonitrile butadiene rubber (NBR) and hydrogenated acrylonitrile butadiene rubber (H-NBR) as binders (for example, refer to Patent Literature (PTL) 1).

CITATION LIST

Patent Literature

PTL 1: JP2007-234277A

SUMMARY

Technical Problem

There are instances in which a fibrous conductive material such as carbon nanotubes (hereinafter, also abbreviated as "CNTs") is used in addition to an electrode active material and a binder as a material for forming an electrode mixed material layer in order to impart sufficient electrical conductivity to the electrode mixed material layer. However, fibrous conductive materials have a high tendency to aggregate. For this reason, a method in which a fibrous conductive material and a binder are premixed in a dispersion medium to obtain a conductive material dispersion liquid and then the obtained conductive material dispersion liquid is combined with an electrode active material, etc. to produce a slurry for an electrode is useful for causing sufficient dispersion of the fibrous conductive material and causing an electrochemical device to display excellent device characteristics.

However, even when a conductive material dispersion liquid has been produced using the polymer in the conventional technique described above, it has not been possible to cause good dispersion of a fibrous conductive material (i.e., to ensure dispersibility of the conductive material dispersion liquid) or to cause an electrochemical device to display excellent cycle characteristics.

Accordingly, one object of the present disclosure is to provide a binder composition for an electrochemical device that is capable of producing a conductive material dispersion liquid having excellent dispersibility and that can cause an electrochemical device to display excellent cycle characteristics.

Another object of the present disclosure is to provide a conductive material dispersion liquid for an electrochemical device that has excellent dispersibility and can cause an electrochemical device to display excellent cycle characteristics.

Another object of the present disclosure is to provide a slurry for an electrochemical device electrode that can cause an electrochemical device to display excellent cycle characteristics.

Another object of the present disclosure is to provide an electrochemical device having excellent cycle characteristics.

Solution to Problem

The inventors conducted diligent investigation with the aim of solving the problem set forth above. The inventors discovered that by using a binder composition that contains a first polymer and a second polymer having specific chemical compositions, it is possible to produce a conductive material dispersion liquid having excellent dispersibility and an electrochemical device having excellent cycle characteristics, and, in this manner, completed the present disclosure.

Specifically, the present disclosure aims to advantageously solve the problem set forth above, and, according to the present disclosure, binder compositions for an electrochemical device according to the following [1] to [10], a conductive material dispersion liquid for an electrochemical device according to the following [11], slurries for an electrochemical device electrode according to the following and [13], an electrode for an electrochemical device according to the following [14], and an electrochemical device according to the following are provided.

[1] A binder composition for an electrochemical device comprising a first polymer, a second polymer, and an organic solvent, wherein the first polymer includes a nitrile group-containing monomer unit and includes either or both of an aliphatic conjugated diene monomer unit and an alkylene structural unit, and the second polymer includes, in a proportion of not less than 70 mass % and not more than 95 mass % when all structural units in the second polymer are taken to be 100 mass %, a structural unit indicated by formula (I), shown below,

[Chem. 1]

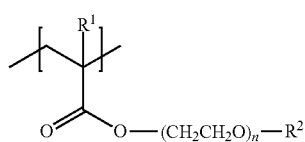

where, in formula (I), $R^1$ represents a hydrogen atom or a methyl group, $R^2$ represents a hydrogen atom, a phenyl group, an alkyl group having a carbon number of not less than 1 and not more than 6, or a phenyl group including not fewer than one and not more than three alkyl groups having a carbon number of not less than 1 and not more than 6, and n represents an integer of 3 or more.

By using a binder composition that contains both the first polymer and the second polymer described above, it is possible to produce a conductive material dispersion liquid having excellent dispersibility and to cause an electrochemical device to display excellent cycle characteristics through an electrode formed using the binder composition.

Note that the term "monomer unit" as used in the present disclosure refers to a "structural unit (repeating unit) derived from that monomer that is included in a polymer obtained using the monomer".

Moreover, the term "alkylene structural unit" as used in the present disclosure refers to a "structural unit composed of only an alkylene structure represented by a general formula $-C_nH_{2n}-$ (n is an integer of 2 or more)".

Furthermore, the proportion in which each structural unit is included in a polymer can be measured by a nuclear magnetic resonance (NMR) method such as $^1$H-NMR or $^{13}$C-NMR.

[2] The binder composition for an electrochemical device according to the foregoing [1], wherein the second polymer further includes an aromatic monovinyl monomer unit.

When the second polymer includes an aromatic monovinyl monomer unit in addition to a structural unit indicated by the previously described formula (I) (hereinafter, also referred to simply as a "structural unit (I)"), dispersibility of a conductive material dispersion liquid can be further improved.

[3] The binder composition for an electrochemical device according to the foregoing [2], wherein the second polymer includes the aromatic monovinyl monomer unit in a proportion of not less than 5 mass % and not more than 30 mass % when all structural units in the second polymer are taken to be 100 mass %.

When the second polymer includes an aromatic monovinyl monomer unit in a proportion that is within the range set forth above, dispersibility of a conductive material dispersion liquid can be even further improved while also causing an electrochemical device to display sufficiently good cycle characteristics.

[4] The binder composition for an electrochemical device according to any one of the foregoing [1] to [3], wherein a proportion constituted by mass of the second polymer among total mass of the first polymer and the second polymer is not less than 10 mass % and not more than 40 mass %.

When the proportion constituted by the mass of the second polymer among the total of the mass of the first polymer and the mass of the second polymer is within the range set forth above, dispersibility of a conductive material dispersion liquid can be further improved while also causing an electrochemical device to display even better cycle characteristics.

[5] The binder composition for an electrochemical device according to any one of the foregoing [1] to [4], further comprising a non-ionic surfactant.

When the binder composition contains a non-ionic surfactant in addition to the first polymer and the second polymer described above, dispersibility of a conductive material dispersion liquid can be further improved while also causing an electrochemical device to display even better cycle characteristics. In addition, the resistance of an electrode that is obtained using the binder composition can be reduced.

[6] The binder composition for an electrochemical device according to the foregoing [5], wherein the non-ionic surfactant is a fatty acid ester-based surfactant.

When the binder composition contains a fatty acid ester-based surfactant as the aforementioned non-ionic surfactant, dispersibility of a conductive material dispersion liquid and cycle characteristics of an electrochemical device can be further improved while also even further reducing resistance of an electrode.

[7] The binder composition for an electrochemical device according to any one of the foregoing [1] to [6], wherein the organic solvent is N-methyl-2-pyrrolidone.

When the binder composition contains N-methyl-2-pyrrolidone (hereinafter, also abbreviated as "NMP") as the organic solvent, dispersibility of a conductive material dispersion liquid can be further improved while also causing an electrochemical device to display even better cycle characteristics.

[8] The binder composition for an electrochemical device according to any one of the foregoing [1] to [7], having a contact angle with a polyethylene film of not less than 30° and not more than 60° when set to a solid content concentration of 15.0 mass %.

When the binder composition, under a condition of a solid content concentration of 15.0 mass %, has a contact angle with a polyethylene film of not less than 30° and not more than 60°, dispersibility of a conductive material dispersion liquid can be further improved while also causing an electrochemical device to display even better cycle characteristics. In addition, an electrode mixed material layer that is obtained using the binder composition can be caused to closely adhere strongly to a current collector (i.e., peel strength of an electrode can be improved), and resistance of an electrode can be reduced.

Note that the "contact angle with a polyethylene film" of a binder composition "when set to a solid content concentration of 15.0 mass %" that is referred to in the present disclosure can be measured by a method described in the EXAMPLES section.

[9] The binder composition for an electrochemical device according to any one of the foregoing [1] to [8], having a haze of 45% or less when set to a solid content concentration of 15.0 mass %.

When the haze of the binder composition under a condition of a solid content concentration of 15.0 mass % is 45% or less, dispersibility of a conductive material dispersion liquid can be further improved while also causing an electrochemical device to display even better cycle characteristics. In addition, the resistance of an electrode that is obtained using the binder composition can be reduced.

Note that the "haze" of a binder composition "when set to a solid content concentration of 15.0 mass %" that is referred to in the present disclosure can be measured by a method described in the EXAMPLES section.

[10] The binder composition for an electrochemical device according to any one of the foregoing [1] to [9], wherein the first polymer has a weight-average molecular weight of not less than 20,000 and not more than 250,000.

When the weight-average molecular weight of the first polymer is within the range set forth above, dispersibility of a conductive material dispersion liquid can be further improved while also causing an electrochemical device to display even better cycle characteristics.

Note that the "weight-average molecular weight" of a polymer referred to in the present disclosure can be measured by a method described in the EXAMPLES section.

[11] A conductive material dispersion liquid for an electrochemical device comprising: the binder composition for an electrochemical device according to any one of the foregoing [1] to [10]; and a fibrous conductive material.

A conductive material dispersion liquid that contains any one of the binder compositions set forth above and a fibrous conductive material has excellent dispersibility, and through an electrode that is formed using this conductive material dispersion liquid, it is possible to cause an electrochemical device to display excellent cycle characteristics.

Note that the term "fibrous conductive material" as used in the present disclosure refers to a conductive material having an aspect ratio of 10 or more as measured using a transmission electron microscope (TEM).

[12] A slurry for an electrochemical device electrode comprising: the conductive material dispersion liquid for an electrochemical device according to the foregoing [11]; and an electrode active material.

By using a slurry for an electrode that contains the conductive material dispersion liquid set forth above and an electrode active material, it is possible to produce an electrode that can cause an electrochemical device to display excellent cycle characteristics.

[13] The slurry for an electrochemical device electrode according to the foregoing [12], further comprising a fluoropolymer.

When the slurry for an electrode contains a fluoropolymer in addition to the conductive material dispersion liquid set forth above and an electrode active material, peel strength of an electrode can be increased while also further improving cycle characteristics of an electrochemical device.

[14] An electrode for an electrochemical device comprising an electrode mixed material layer formed using the slurry for an electrochemical device electrode according to the foregoing [12] or [13].

Through an electrode that includes an electrode mixed material layer obtained using the slurry for an electrode set forth above, it is possible to cause an electrochemical device to display excellent cycle characteristics.

An electrochemical device comprising the electrode for an electrochemical device according to the foregoing [14].

An electrochemical device that includes the electrode set forth above has excellent cycle characteristics.

Advantageous Effect

According to the present disclosure, it is possible to provide a binder composition for an electrochemical device that is capable of producing a conductive material dispersion liquid having excellent dispersibility and that can cause an electrochemical device to display excellent cycle characteristics.

Moreover, according to the present disclosure, it is possible to provide a conductive material dispersion liquid for an electrochemical device that has excellent dispersibility and can cause an electrochemical device to display excellent cycle characteristics.

Furthermore, according to the present disclosure, it is possible to provide a slurry for an electrochemical device electrode that can cause an electrochemical device to display excellent cycle characteristics.

Also, according to the present disclosure, it is possible to provide an electrochemical device having excellent cycle characteristics.

DETAILED DESCRIPTION

The following provides a detailed description of embodiments of the present disclosure.

A presently disclosed binder composition for an electrochemical device can be used in production of a slurry for an electrochemical device electrode. Moreover, the presently disclosed binder composition for an electrochemical device can be mixed with a fibrous conductive material such as CNTs to obtain a presently disclosed conductive material dispersion liquid for an electrochemical device containing the binder composition for an electrochemical device and the fibrous conductive material and can then be used in production of a slurry for an electrochemical device electrode. Furthermore, a presently disclosed slurry for an electrochemical device electrode that is produced using the conductive material dispersion liquid for an electrochemical device can be used in formation of an electrode of an electrochemical device such as a lithium ion secondary battery. Also, a feature of a presently disclosed electrochemical device is that it includes a presently disclosed electrode for an electrochemical device formed using the slurry for an electrochemical device electrode.

(Binder Composition for Electrochemical Device)

The presently disclosed binder composition contains a first polymer, a second polymer, and an organic solvent, and optionally further contains a non-ionic surfactant and components other than the first polymer, the second polymer, the organic solvent, and the non-ionic surfactant (i.e., other components).

In the presently disclosed binder composition, it is required that:
 the first polymer includes a nitrile group-containing monomer unit and includes either or both of an aliphatic conjugated diene monomer unit and an alkylene structural unit; and
 the second polymer includes a structural unit (I) including a polyoxyethylene group in which at least a specific number of oxyethylene structures ($—CH_2CH_2O—$) are linked in a proportion of not less than 70 mass % and not more than 95 mass %.

By using the presently disclosed binder composition that contains both the first polymer and the second polymer described above, it is possible to produce a conductive material dispersion liquid that has excellent dispersibility and an electrode that can cause an electrochemical device to display excellent cycle characteristics.

<First Polymer>

The first polymer is a component that, in an electrode mixed material layer formed using the binder composition, can function as a binder that holds an electrode active material, etc. so that they do not detach from a current collector. Moreover, the first polymer can also function as a dispersant that can disperse a fibrous conductive material in a conductive material dispersion liquid that is produced using the binder composition.

<<Chemical Composition>>

The first polymer includes at least a nitrile group-containing monomer unit and an aliphatic conjugated diene monomer unit and/or an alkylene structural unit as previously described. Note that the first polymer may include structural units other than a nitrile group-containing monomer unit, an aliphatic conjugated diene monomer unit, and an alkylene structural unit (i.e., other structural units).

[Nitrile Group-Containing Monomer Unit]

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Note that one nitrile group-containing monomer may be used individually, or two or more nitrile group-containing monomers may be used in combination in a freely selected ratio. Of these nitrile group-containing monomers, acrylonitrile is preferable.

The proportional content of nitrile group-containing monomer units in the first polymer when all structural units in the first polymer are taken to be 100 mass % is preferably 10 mass % or more, more preferably 15 mass % or more, even more preferably 20 mass % or more, further preferably 30 mass % or more, and particularly preferably 36 mass % or more, and is preferably 55 mass % or less, more preferably 50 mass % or less, even more preferably 45 mass % or less, and particularly preferably 40 mass % or less. When the proportional content of nitrile group-containing monomer units in the first polymer is within any of the ranges set forth above, solubility of the first polymer in an organic solvent (particularly NMP) is sufficiently ensured, and dispersibility of a conductive material dispersion liquid can be further improved. Moreover, peel strength of an electrode that is obtained using the binder composition can be improved.

[Aliphatic Conjugated Diene Monomer Unit and Alkylene Structural Unit]

Examples of aliphatic conjugated diene monomers that can form an aliphatic conjugated diene monomer unit include conjugated diene compounds having a carbon number of 4 or more such as 1,3-butadiene, isoprene, 2,3-dimethyl-1,3-butadiene, 2-ethyl-1,3-butadiene, and 1,3-pentadiene. One of these aliphatic conjugated diene monomers may be used individually, or two or more of these aliphatic conjugated diene monomers may be used in combination in a freely selected ratio. Of these aliphatic conjugated diene monomers, 1,3-butadiene is preferable.

Although the alkylene structural unit may be linear or branched, it is preferable that the alkylene structural unit is linear (i.e., is a linear alkylene structural unit) from a viewpoint of further improving dispersibility of a conductive material dispersion liquid and cycle characteristics of an electrochemical device. Moreover, the alkylene structural unit preferably has a carbon number of 4 or more (i.e., n in the previously described general formula —$C_nH_{2n}$— is preferably an integer of 4 or more).

Examples of methods by which the alkylene structural unit can be introduced into the first polymer include, but are not specifically limited to, the following methods (1) and (2).

(1) A method in which a polymer is produced from a monomer composition containing an aliphatic conjugated diene monomer and then the polymer is hydrogenated so as to convert an aliphatic conjugated diene monomer unit to an alkylene structural unit (2) A method in which a polymer is produced from a monomer composition containing a 1-olefin monomer Of these methods, method (1) is preferable in terms of ease of production of the first polymer.

Examples of aliphatic conjugated diene monomers that can be used in method (1) include aliphatic conjugated diene monomers that were previously described as "aliphatic conjugated diene monomers that can form an aliphatic conjugated diene monomer unit". Of these aliphatic conjugated diene monomers, 1,3-butadiene is preferable. In other words, the alkylene structural unit is preferably a structural unit obtained through hydrogenation of an aliphatic conjugated diene monomer unit (i.e., is preferably a hydrogenated aliphatic conjugated diene unit), and is more preferably a structural unit obtained through hydrogenation of a 1,3-butadiene monomer unit (i.e., is more preferably a hydrogenated 1,3-butadiene unit).

Moreover, the 1-olefin monomer may be ethylene, propylene, 1-butene, or the like, for example.

Note that in formation of the alkylene structural unit, one aliphatic conjugated diene monomer or 1-olefin monomer may be used individually, or two or more aliphatic conjugated diene monomers or 1-olefin monomers may be used in combination in a freely selected ratio.

The first polymer should include either or both of an aliphatic conjugated diene monomer unit and an alkylene structural unit as previously described. In other words, the first polymer may include an alkylene structural unit and not include an aliphatic conjugated diene monomer unit, may include an aliphatic conjugated diene monomer unit and not include an alkylene structural unit, or may include both an aliphatic conjugated diene monomer unit and an alkylene structural unit. However, from a viewpoint of further improving dispersibility of a conductive material dispersion liquid and cycle characteristics of an electrochemical device, it is preferable that the first polymer includes at least an alkylene structural unit from among an aliphatic conjugated diene monomer unit and an alkylene structural unit, and more preferable that the first polymer includes both an aliphatic conjugated diene monomer unit and an alkylene structural unit.

The total proportional content of aliphatic conjugated diene monomer units and alkylene structural units in the first polymer when all structural units in the first polymer are taken to be 100 mass % is preferably 45 mass % or more, more preferably 50 mass % or more, even more preferably 55 mass % or more, and particularly preferably 60 mass % or more, and is preferably 90 mass % or less, more preferably 85 mass % or less, even more preferably 80 mass % or less, and particularly preferably 70 mass % or less. When the total of the proportional content of aliphatic conjugated diene monomer units and the proportional content of alkylene structural units in the first polymer is within any of the ranges set forth above, dispersibility of a conductive material dispersion liquid can be further improved, which is presumed to be due to increased affinity between the first polymer and a fibrous conductive material such as CNTs. Moreover, cycle characteristics of an electrochemical device can be even further improved due to a fibrous conductive material such as CNTs being coated well by the first polymer.

[Other Structural Units]

Examples of other structural units include, but are not specifically limited to, a (meth)acrylic acid ester monomer unit, an aromatic monovinyl monomer unit, and a hydrophilic group-containing monomer unit. The first polymer may include one type of other repeating unit or may include two or more types of other repeating units.

Note that in the present disclosure, "(meth)acryl" is used to indicate "acryl" and/or "methacryl".

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. Note that one (meth) acrylic acid ester monomer may be used individually, or two or more (meth)acrylic acid ester monomers may be used in combination in a freely selected ratio.

Examples of aromatic monovinyl monomers that can form an aromatic monovinyl monomer unit include styrene, α-methylstyrene, p-t-butylstyrene, butoxystyrene, vinyltoluene, chlorostyrene, and vinylnaphthalene. Note that one aromatic monovinyl monomer may be used individually, or two or more aromatic monovinyl monomers may be used in combination in a freely selected ratio.

The hydrophilic group-containing monomer unit may be a carboxy group-containing monomer unit, a sulfo group-containing monomer unit, a phosphate group-containing monomer unit, or a hydroxy group-containing monomer unit. In other words, examples of hydrophilic group-containing monomers that can form a hydrophilic group-containing monomer unit include carboxy group-containing monomers, sulfo group-containing monomers, phosphate group-containing monomers, and hydroxy group-containing monomers. Note that one hydrophilic group-containing monomer may be used individually, or two or more hydrophilic group-containing monomers may be used in combination in a freely selected ratio.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-transaryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a carboxy group-containing monomer.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

Note that in the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)acryloyl" is used to indicate "acryloyl" and/or "methacryloyl".

Examples of hydroxy group-containing monomers include ethylenically unsaturated alcohols such as (meth) allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^4—COO—(C_kH_{2k}O)_m—H$ (where m represents an integer of 2 to 9, k represents an integer of 2 to 4, and $R^4$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

In a case in which the first polymer includes other structural units, the proportional content of the other structural units in the first polymer is preferably 10 mass % or less when all structural units in the first polymer are taken to be 100 mass %. This is because dispersibility of a conductive material dispersion liquid can be further improved when the proportional content of other structural units is 10 mass % or less. It should be noted that the first polymer may of course not include other structural units. In other words, the proportional content of other structural units in the first polymer may be 0 mass %.

<<Properties>>

Although no specific limitations are made, it is preferable that the first polymer has the following properties.

[Iodine Value]

Firstly, the iodine value of the first polymer is preferably 60 mg/100 mg or less, more preferably 30 mg/100 mg or less, even more preferably 20 mg/100 mg or less, further preferably 10 mg/100 mg or less, and particularly preferably 5 mg/100 mg or less. When the iodine value of the first polymer is 60 mg/100 mg or less, cycle characteristics of an electrochemical device can be further improved. The lower limit for the iodine value of the first polymer is not specifically limited and may be 1 mg/100 mg or more, for example.

Note that the "iodine value" referred to in the present disclosure can be measured by a method described in the EXAMPLES section.

[Weight-Average Molecular Weight]

The weight-average molecular weight of the first polymer is preferably 20,000 or more, and more preferably 25,000 or more, and is preferably 250,000 or less, more preferably 200,000 or less, even more preferably 150,000 or less, further preferably 100,000 or less, and particularly preferably 50,000 or less. When the weight-average molecular weight of the first polymer is 20,000 or more, cycle characteristics of an electrochemical device can be further improved, which is presumed to be due to elution of the first polymer into electrolyte solution being inhibited. On the other hand, when the weight-average molecular weight of the first polymer is 250,000 or less, dispersibility of a conductive material dispersion liquid can be further increased.

<<Production Method>>

No specific limitations are placed on the method by which the first polymer is produced. For example, the first polymer may be produced by polymerizing a monomer composition containing the above-described monomers in an aqueous solvent and then optionally performing hydrogenation. Note that the proportional content of each monomer in the monomer composition can be set in accordance with the proportional content of each structural unit in the first polymer.

The polymerization method is not specifically limited and may, for example, be any of solution polymerization, suspension polymerization, bulk polymerization, and emulsion polymerization. Moreover, the polymerization reaction may be addition polymerization such as ionic polymerization, radical polymerization, or living radical polymerization. Furthermore, a known polymerization initiator such as a redox polymerization initiator including an iron-based compound can be used as a polymerization initiator.

The molecular weight (particularly weight-average molecular weight) of the obtained first polymer can be adjusted by using a molecular weight modifier in the polymerization. This molecular weight modifier may, for example, be a compound that includes a sulfur-containing group such as a mercapto group. Examples of compounds including a mercapto group that may be used as a molecular weight modifier include mercapto group-containing compounds having a carbon number of 8 to 12 such as octyl mercaptan, 2,2,4,6,6-pentamethyl-4-heptanethiol, 2,4,4,6,6-pentamethyl-2-heptanethiol, 2,3,4,6,6-pentamethyl-2-heptanethiol, 2,3,4,6,6-pentamethyl-3-heptanethiol, t-dodecyl mercaptan, and n-dodecyl mercaptan; and mercapto group-containing compounds such as 2,2,4,6,6-pentamethyl-4-octanethiol, 2,2,4,6,6,8,8-heptamethyl-4-nonanethiol, bis(2-mercaptoethyl) sulfide, methyl 3-mercaptopropionate, and 1-butanethiol.

In a situation in which the first polymer is produced by method (1), radical polymerization using a redox polymerization initiator that includes an iron-based compound is preferably adopted as the polymerization method of the polymer that is to be hydrogenated (i.e., a polymer including a nitrile group-containing monomer unit and an aliphatic conjugated diene monomer unit). The redox polymerization initiator including an iron-based compound may be a combination of cumene hydroperoxide as a polymerization initiator and ferrous sulfate and/or ethylenediaminetetraacetic acid iron monosodium salt as an iron-based compound, for example, but is not specifically limited thereto.

Moreover, in a situation in which the first polymer is produced by method (1), it is preferable that a coagulant is used to perform coagulation after emulsion polymerization, and then collected material is subjected to hydrogenation (after optionally performing a "metathesis reaction" described below).

The hydrogenation can be performed using a known hydrogenation method such as an oil-layer hydrogenation method or a water-layer hydrogenation method. The catalyst used in the hydrogenation may be any selective hydrogenation catalyst that is commonly known such as a palladium-based catalyst or a rhodium-based catalyst. Two or more of such catalysts may be used in combination.

The hydrogenation of the polymer may be performed by a method described in JP4509792B2, for example. Specifically, the hydrogenation of the polymer may be carried out after a metathesis reaction of the polymer in the presence of a catalyst and a co-olefin.

The catalyst in the metathesis reaction may be a known ruthenium-based catalyst. Of such catalysts, Grubbs' catalysts such as bis(tricyclohexylphosphine)benzylidene ruthenium dichloride and 1,3-bis(2,4,6-trimethylphenyl)-2-(imidazolidinylidene)(dichlorophenylmethylene) (tricyclohexylphosphine)ruthenium are preferable as the catalyst in the metathesis reaction. The co-olefin may be an olefin having a carbon number of 2 to 16 such as ethylene, isobutene, or 1-hexene. Furthermore, a known homogeneous hydrogenation catalyst such as Wilkinson's catalyst (($PPh_3$)$_3$RhCl), for example, can be used as a hydrogenation catalyst in hydrogenation performed after the metathesis reaction.

<Second Polymer>

The second polymer is a component that can function as a binder and/or a dispersant in the same manner as the first polymer.

<<Chemical Composition>>

The second polymer includes a structural unit (I) in a proportion of not less than 70 mass % and not more than 95 mass % as previously described and includes structural units other than the structural unit (I) (i.e., other structural units) in a proportion of not less than 5 mass % and not more than 30 mass %.

The second polymer has a polyoxyethylene group as a side chain as a result of including the structural unit (I). It is presumed that due to the contribution of this side chain to enabling good coating of an electrode active material by the second polymer, the inclusion of the second polymer in the binder composition enables good protection of an electrode active material through polymer components and, as a result, enables improvement of cycle characteristics of an electrochemical device.

[Structural Unit (I)]

The structural unit (I) has a structure of the following formula (I) as previously described.

[Chem. 2]

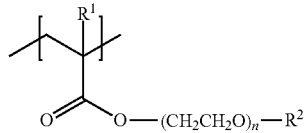

(I)

In formula (I), $R^1$ represents a hydrogen atom or a methyl group, $R^2$ represents a hydrogen atom, a phenyl group, an alkyl group having a carbon number of not less than 1 and not more than 6, or a phenyl group including not fewer than one and not more than three alkyl groups having a carbon number of not less than 1 and not more than 6, and n represents an integer of 3 or more.

Note that n in the structural unit (I) is required to be an integer of 3 or more as previously described, is preferably an integer of 4 or more, and more preferably an integer of 5 or more, and is preferably an integer of 25 or less, and more preferably an integer of 15 or less. Cycle characteristics of an electrochemical device deteriorate in a situation in which n is an integer of less than 3 (i.e., is 1 or 2). In addition, resistance of an electrode increases, and peel strength of the electrode is lost. On the other hand, when n is an integer of 25 or less, the amount of water that is imported into an electrochemical device can be reduced while also ensuring peel strength of an electrode and improving cycle characteristics of the electrochemical device. Moreover, excessive thickening of the binder composition or a conductive material dispersion liquid due to excessive lengthening of the polyoxyethylene group can be inhibited.

$R^1$ in the structural unit (I) is a hydrogen atom or a methyl group as previously described, and is preferably a hydrogen atom.

Moreover, $R^2$ in the structural unit (I) is a hydrogen atom, a phenyl group, an alkyl group having a carbon number of not less than 1 and not more than 6, or a phenyl group including not fewer than one and not more than three alkyl groups having a carbon number of not less than 1 and not more than 6 as previously described.

An alkyl group having a carbon number of not less than 1 and not more than 6 that constitutes part or all of $R^2$ may be a methyl group, an ethyl group, a n-propyl group, an isopropyl group, an n-butyl group, a t-butyl group, an isobutyl group, or a sec-butyl group, for example, without any specific limitations.

$R^2$ is preferably a hydrogen atom or an alkyl group having a carbon number of not less than 1 and not more than 6, and is more preferably a hydrogen atom or a methyl group.

Note that the first polymer may include one type of the structural unit (I) or may include two or more types of the structural unit (I).

Examples of monomers that can form the structural unit (I) include a polyoxyethylene group-containing monomer represented by the following formula (II) (hereinafter, also referred to simply as a "monomer (II)").

[Chem. 3]

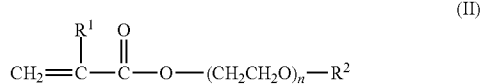

(II)

In formula (II), n, $R^1$, and $R^2$ are the same as those corresponding thereto in formula (I), and preferred ranges and preferred examples thereof are also the same as the preferred ranges and preferred examples for formula (I).

The monomer (II) may be a polyoxyethylene group-containing (meth)acrylate such as AM-90G, AM-130G, M-90G, or M-230G (product names) produced by Shin-Nakamura Chemical Co., Ltd. or BLEMMER® (BLEMMER is a registered trademark in Japan, other countries, or both) PME-200 (product name) produced by NOF Corporation. One of these examples may be used individually, or two or more of these examples may be used in combination in a freely selected ratio.

The proportional content of structural units (I) in the second polymer when all structural units in the second polymer are taken to be 100 mass % is required to be not less than 70 mass % and not more than 95 mass % as previously described, is preferably 72 mass % or more, more preferably 76 mass % or more, and even more preferably 80 mass % or more, and is preferably 90 mass % or less, more preferably 87 mass % or less, and even more preferably 84 mass % or less. Cycle characteristics of an electrochemical device deteriorate in a situation in which the proportional content of structural units (I) is less than 70 mass %, whereas dispersibility of a conductive material dispersion liquid is lost in a situation in which the proportional content of structural units (I) is more than 95 mass %.

[Other Structural Units]

No specific limitations are placed on other structural units so long as they are structural units derived from monomers that are copolymerizable with the previously described monomer (II) that can form the structural unit (I). For example, any of the various structural units that were previously described in the "First polymer" section or a known cross-linkable monomer unit (for example, a cross-linkable monomer unit described in JP2017-027856A) can be adopted as another structural unit. Of these examples, an aromatic monovinyl monomer unit is preferable as another structural unit that is included in the second polymer. When the second polymer includes an aromatic monovinyl monomer unit in addition to the previously described structural unit (I), the second polymer can adsorb well to a fibrous conductive material in a conductive material dispersion liquid and can further improve dispersibility of the conductive material dispersion liquid. This is presumed to be due to an aromatic monovinyl monomer unit having excellent affinity with a fibrous conductive material such as CNTs.

Examples of aromatic monovinyl monomers that can form an aromatic monovinyl monomer unit include the same aromatic monovinyl monomers as previously described in the "First polymer" section. Note that one aromatic monovinyl monomer may be used individually, or two or more aromatic monovinyl monomers may be used in combination in a freely selected ratio. Moreover, styrene is preferable as an aromatic monovinyl monomer from a viewpoint of even further improving dispersibility of a conductive material dispersion liquid.

The proportional content of aromatic monovinyl monomer units in the second polymer when all structural units in the second polymer are taken to be 100 mass % is preferably 5 mass % or more, more preferably 10 mass % or more, even more preferably 13 mass % or more, further preferably 16 mass % or more, and particularly preferably 20 mass % or more, and is 30 mass % or less, preferably 28 mass % or less, and more preferably 24 mass % or less. Dispersibility of a conductive material dispersion liquid further improves when the proportional content of aromatic monovinyl monomer units is 5 mass % or more, whereas cycle characteristics of an electrochemical device can be sufficiently ensured when the proportional content of aromatic monovinyl monomer units is 30 mass % or less.

<<Weight-Average Molecular Weight>>

The weight-average molecular weight of the second polymer is preferably 5,000 or more, more preferably 10,000 or more, even more preferably 15,000 or more, and particularly preferably 25,000 or more, and is preferably 50,000 or less, more preferably 45,000 or less, and even more preferably 40,000 or less. When the weight-average molecular weight of the second polymer is within any of the ranges set forth above, dispersibility of a conductive material dispersion liquid can be further increased while also even further improving cycle characteristics of an electrochemical device, which is presumed to be because affinity of the second polymer with a fibrous conductive material increases, and the second polymer can even better protect an electrode active material.

<<Production Method of Second Polymer>>

No specific limitations are placed on the method by which the second polymer is produced. For example, the second polymer may be produced by polymerizing a monomer composition containing the above-described monomers in an aqueous solvent. Note that the proportional content of each monomer in the monomer composition can be set in accordance with the proportional content of each structural unit in the second polymer.

The polymerization method is not specifically limited and may, for example, be any of solution polymerization, suspension polymerization, bulk polymerization, and emulsion polymerization. Moreover, the polymerization reaction may be addition polymerization such as ionic polymerization, radical polymerization, or living radical polymerization. Furthermore, a known polymerization initiator, molecular weight modifier, emulsifier, or the like can be used.

<<Mixing Ratio of First Polymer and Second Polymer>>

Although no specific limitations are placed on the mixing ratio of the first polymer and the second polymer in the presently disclosed binder composition, the proportion constituted by the mass of the second polymer among the total mass of the first polymer and the second polymer is preferably 10 mass % or more, more preferably 15 mass % or more, even more preferably 20 mass % or more, further preferably 25 mass % or more, and particularly preferably 30 mass % or more, and is preferably 40 mass % or less, more preferably 37 mass % or less, and even more preferably 33 mass % or less. Cycle characteristics of an electrochemical device can be further improved when the proportion constituted by the second polymer among the total mass of the first polymer and the second polymer is 10 mass % or more, whereas dispersibility of a conductive material dispersion liquid can be even further increased when the proportion constituted by the second polymer among the total mass of the first polymer and the second polymer is 40 mass % or less.

<Organic Solvent>

The organic solvent is not specifically limited so long as it is an organic solvent in which the first polymer and the second polymer described above can be dissolved and/or dispersed, and examples thereof include alcohols such as methanol, ethanol, n-propanol, isopropanol, n-butanol, isobutanol, t-butanol, pentanol, hexanol, heptanol, octanol, nonanol, decanol, and amyl alcohol; ketones such as acetone, methyl ethyl ketone, and cyclohexanone; esters such as ethyl acetate and butyl acetate; ethers such as diethyl ether, dioxane, and tetrahydrofuran; amide polar organic solvents such as N,N-dimethylformamide and NMP; and aromatic hydrocarbons such as toluene, xylene, chlorobenzene, orthodichlorobenzene, and paradichlorobenzene. One of these organic solvents may be used individually, or two or more of these organic solvents may be used as a mixture. Of these organic solvents, NMP is preferable from a viewpoint of further improving dispersibility of a conductive material dispersion liquid while also causing an electrochemical device to display even better cycle characteristics.

<Non-Ionic Surfactant>

The presently disclosed binder composition preferably contains a non-ionic surfactant. When the presently disclosed binder composition contains a non-ionic surfactant, dispersibility of a conductive material dispersion liquid can be further increased, resistance of an electrode can be reduced, and cycle characteristics of an electrochemical device can be even further improved, which is presumed to be due to improved affinity between the previously described first polymer and second polymer.

The non-ionic surfactant may be a polyoxyalkylene alkyl aryl ether-based surfactant, a polyoxyalkylene alkyl ether-based surfactant, a fatty acid ester-based surfactant, a silicone-based surfactant, an acetylene alcohol-based surfactant, or a fluorine-containing surfactant, for example.

Examples of polyoxyalkylene alkyl aryl ether-based surfactants include polyoxyethylene nonylphenyl ether, polyoxyethylene octylphenyl ether, and polyoxyethylene dodecylphenyl ether.

Examples of polyoxyalkylene alkyl ether surfactants include polyoxyethylene oleyl ether, polyoxyethylene lauryl ether, polyoxyethylene cetyl ether, polyoxyethylene oleyl cetyl ether, and polyoxyethylene alkyl ethers (having an alkyl portion carbon number of not less than 12 and not more than 14).

Examples of fatty acid ester-based surfactants include fatty acid ester-based surfactants that have a polyoxyalkylene group such as polyoxyethylene monolaurate, polyoxyethylene monostearate, polyoxyethylene monooleate.

Examples of silicone-based surfactants include dimethylpolysiloxane and the like.

Examples of fluorine-containing surfactants include fluoroalkyl esters and the like.

Of these non-ionic surfactants, fatty acid ester-based surfactants are preferable from a viewpoint of further improving dispersibility of a conductive material dispersion liquid and cycle characteristics of an electrochemical device while also even further reducing resistance of an electrode, fatty acid ester-based surfactants having a polyoxyalkylene group are more preferable, and polyoxyethylene monolaurate is even more preferable.

The content of the non-ionic surfactant in the presently disclosed binder composition when the total mass of the previously described first polymer and second polymer is taken to be 100 parts by mass is preferably 0.05 parts by mass or more, and more preferably 0.1 parts by mass or more, and is preferably 10 parts by mass or less, and more preferably 5 parts by mass or less. When the amount of the non-ionic surfactant that is contained in the binder composition is 0.05 parts by mass or more relative to 100 parts by mass of total mass of the first polymer and the second polymer, dispersibility of a conductive material dispersion liquid and cycle characteristics of an electrochemical device can be further improved, and resistance of an electrode can be even further reduced. On the other hand, when the amount of the non-ionic surfactant that is contained in the binder composition is 10 parts by mass or less relative to 100 parts by mass of total mass of the first polymer and the second polymer, peel strength of an electrode can be improved while also sufficiently reducing resistance of the electrode.

<Other Components>

Examples of other components that can be contained in the presently disclosed binder composition in addition to the first polymer, the second polymer, the organic solvent, and the non-ionic surfactant include, but are not specifically limited to, binders (subsequently described fluoropolymer, etc.) other than the first polymer and the second polymer, reinforcing materials, leveling agents, viscosity modifiers, and additives for electrolyte solution. These other components are not specifically limited so long as they do not affect battery reactions and may be selected from commonly known components such as those described in WO2012/115096A1.

Note that one of these other components may be used individually, or two or more of these other components may be used in combination in a freely selected ratio.

<Properties of Binder Composition>

Although no specific limitations are made, it is preferable that the presently disclosed binder composition has the following properties.

<<Contact Angle with Polyethylene Film>>

The contact angle with a polyethylene film of the presently disclosed binder composition when set to a solid content concentration of 15.0 mass % is preferably 30° or more, more preferably 35° or more, even more preferably 40° or more, and particularly preferably 45° or more, and is preferably 60° or less, more preferably 55° or less, and even more preferably 50° or less. According to studies conducted by the inventors, the contact angle of a binder composition and a polyethylene film containing carbon atoms as a main component can serve as an indicator for estimating the affinity between the binder composition and a fibrous conductive material (particularly a fibrous carbon material such as CNTs). Specifically, when the binder composition has a contact angle with a polyethylene film of 30° or more under a condition of a solid content concentration of 15.0 mass %, resistance of an electrode can be reduced, which is presumed to be because affinity between the binder composition and a fibrous conductive material is inhibited from increasing excessively and a good dispersion state of the fibrous conductive material is maintained in a conductive material dispersion liquid. On the other hand, when the binder composition has a contact angle with a polyethylene film of 60° or less under a condition of a solid content concentration of 15.0 mass %, peel strength of an electrode can be improved, which is presumed to be because affinity between the binder composition and a fibrous conductive material is sufficiently ensured and seeping out (bleeding) of the fibrous conductive material can be inhibited when an electrode is produced through drying of a slurry for an electrode that contains a conductive material dispersion liquid. Moreover, dispersibility of a conductive material dispersion liquid can be further improved while also causing an electrochemical device to display even better cycle characteristics.

Note that the "contact angle with a polyethylene film" of the binder composition "when set to a solid content concentration of 15.0 mass %" can be controlled by altering the mixing ratio of the first polymer and the second polymer in the binder composition, the content of the non-ionic surfactant in the binder composition, and conditions (subsequently described mixing temperature, etc.) in production of the binder composition.

<<Haze>>

The haze of the presently disclosed binder composition when set to a solid content concentration of 15.0 mass % is preferably 45% or less, more preferably 40% or less, even more preferably 30% or less, further preferably 20% or less, and particularly preferably 15% or less. When the haze of the binder composition under a condition of a solid content concentration of 15.0 mass % is 45% or less, dispersibility of a conductive material dispersion liquid can be further improved while also causing an electrochemical device to display even better cycle characteristics. In addition, resistance of an electrode can be reduced.

The lower limit for the haze of the binder composition under a condition of a solid content concentration of 15.0 mass % is not specifically limited and can be set as 1% or more, or can be set as 5% or more, for example.

Note that the "haze" of the binder composition "when set to a solid content concentration of 15.0 mass %" can be controlled by altering the content of the non-ionic surfactant in the binder composition and conditions (subsequently described mixing order, etc.) in production of the binder composition.

A sample that is a measurement subject for the contact angle and haze described above (i.e., a binder composition having a solid content concentration of 15.0 mass %) can be prepared as follows.

First, the solid content concentration is measured in the case of a binder composition having an unknown solid content concentration. Note that the solid content concentration of the binder composition can be measured in accordance with JIS K 6387-2:2011.

In a case in which the binder composition has a solid content concentration of 15.0 mass %, the binder composition is used as a sample in that form. In other cases, the solid content concentration of the binder composition is adjusted to obtain a sample by a known method that does not have an effect of thermal denaturing or the like with respect to solid content such as the first polymer and the second polymer. For example, in a case in which the solid content concentration of the binder composition is more than 15.0 mass %, the solid content concentration is adjusted to 15.0 mass % to obtain a sample through addition of the same organic solvent (for example, NMP) as the organic solvent that is contained in the binder composition.

<Production Method of Binder Composition>

No specific limitations are placed on the method by which the presently disclosed binder composition is produced. The presently disclosed binder composition can be obtained by mixing the above-described components using a known mixing device such as a disper blade, for example.

The temperature during mixing (mixing temperature) when the above-described components are mixed to obtain the binder composition is preferably 5° C. or higher, and more preferably 18° C. or higher, and is preferably 50° C. or lower, and more preferably 40° C. or lower. When the mixing temperature is within any of the ranges set forth above, the value of the contact angle of the obtained binder composition with a polyethylene film can be controlled well. As a result, dispersibility of a conductive material dispersion liquid can be further improved while also causing an electrochemical device to display even better cycle characteristics. In addition, peel strength of an electrode can be improved, and resistance of the electrode can be reduced.

In a case in which a binder composition containing the previously described non-ionic surfactant is to be produced, it is preferable that the first polymer and the non-ionic surfactant are first mixed to obtain a premix, and then the obtained premix and the second polymer are mixed. By adopting such a mixing order, it is possible to achieve good control of the previously described haze value of the obtained binder composition. As a result, dispersibility of a conductive material dispersion liquid can be further improved while also causing an electrochemical device to display even better cycle characteristics. In addition, the resistance of an electrode that is obtained using the binder composition can be reduced.

(Conductive Material Dispersion Liquid)

The presently disclosed conductive material dispersion liquid is a composition that contains a fibrous conductive material and the binder composition set forth above. In other words, the presently disclosed conductive material dispersion liquid contains a fibrous conductive material, the previously described first polymer, the previously described second polymer, and the previously described organic solvent, and optionally contains a conductive material other than a fibrous conductive material (i.e., another conductive material), the previously described non-ionic surfactant, and/or other components. As a result of the presently disclosed conductive material dispersion liquid containing the presently disclosed binder composition, the presently disclosed conductive material dispersion liquid has excellent dispersibility, and an electrochemical device can be caused to display excellent cycle characteristics through an electrode that is formed using the conductive material dispersion liquid.

Note that the presently disclosed conductive material dispersion liquid is an intermediate product for producing the presently disclosed slurry for an electrode described further below and does not normally contain an electrode active material. Also note that the first polymer and the second polymer that are contained in the presently disclosed conductive material dispersion liquid and the non-ionic surfactant that is optionally contained in the presently disclosed conductive material dispersion liquid originate from the presently disclosed binder composition and that the preferred ratio thereof is the same as in the presently disclosed binder composition.

<Fibrous Conductive Material>

The fibrous conductive material may be a fibrous carbon material such as carbon nanotubes (single-walled CNTs or multi-walled CNTs), carbon nanohorns, carbon nanofiber, or milled carbon fiber, for example. Note that one fibrous conductive material may be used individually, or two or more fibrous conductive materials may be used in combination in a freely selected ratio. Of these fibrous conductive materials, carbon nanotubes are preferable from a viewpoint of further improving cycle characteristics of an electrochemical device while also reducing resistance.

<<Properties>>

Although no specific limitations are made, it is preferable that the fibrous conductive material (CNTs, etc.) has the following properties.

[Surface Base Content]

The surface base content of the fibrous conductive material is preferably 0.01 mmol/g or more, and more preferably 0.02 mmol/g or more, and is preferably 0.10 mmol/g or less, and more preferably 0.08 mmol/g or less. When the surface base content of the fibrous conductive material is 0.01 mmol/g or more, few residual acid components are attached to the surface of the fibrous conductive material, and reduction of dispersibility of the conductive material dispersion liquid due to side reactions can be inhibited. On the other hand, when the surface base content of the fibrous conductive material is 0.10 mmol/g or less, resistance of an electrode can be reduced, which is presumed to be because aggregation of the fibrous conductive material can be inhibited.

Note that the "surface base content" and "surface acid content" of a fibrous conductive material referred to in the present disclosure can be measured by methods described in the EXAMPLES section.

[Surface Acid Content/Surface Base Content]

A ratio of surface acid content relative to surface base content (surface acid content/surface base content) of the fibrous conductive material is preferably 0.1 or more, and more preferably 0.2 or more, and is preferably 1.0 or less, more preferably 0.8 or less, even more preferably 0.6 or less, and particularly preferably 0.5 or less. When surface acid content/surface base content is 0.1 or more, adhesiveness of an electrode mixed material layer that is obtained using the conductive material dispersion liquid is sufficiently ensured, and peel strength of an electrode can be improved. On the other hand, when surface acid content/surface base content is 1.0 or less, dispersibility of the conductive material dispersion liquid can be further improved.

[BET Specific Surface Area]

The BET specific surface area of the fibrous conductive material is preferably 100 $m^2/g$ or more, more preferably 150 $m^2/g$ or more, and even more preferably 200 $m^2/g$ or more, and is preferably 300 $m^2/g$ or less. Resistance of an electrode can be reduced when the BET specific surface area is 100 $m^2/g$ or more, whereas peel strength of an electrode can be sufficiently ensured when the BET specific surface area is 300 $m^2/g$ or less, which is presumed to because the first polymer and/or the second polymer can bind the fibrous conductive material well.

Note that the "BET specific surface area" of a fibrous conductive material referred to in the present disclosure can be measured by a method described in the EXAMPLES section.

<<Production Method>>

No specific limitations are placed on the method by which the fibrous conductive material is produced. The following gives CNTs for which surface base content and a value of surface acid content/surface base content are within any of the preferred ranges set forth above as an example and describes the production method thereof.

The CNTs for which surface base content and a value of surface acid content/surface base content are within any of the preferred ranges set forth above can be produced through a step of performing acid treatment of feedstock CNTs (acid treatment step), a step of performing base treatment of the feedstock CNTs that have undergone acid treatment (base treatment step), and a step of washing the feedstock CNTs that have undergone base treatment (washing step).

—Acid Treatment Step—

In the acid treatment step, feedstock CNTs are subjected to acid treatment. The feedstock CNTs can be selected as appropriate from known CNTs in accordance with the desired surface-treated CNT properties (number of walls, BET specific surface area, etc.) without any specific limitations.

Although no specific limitations are placed on the method of acid treatment so long as an acid can be brought into contact with the feedstock CNTs, a method in which the feedstock CNTs are immersed in an acid treatment solution (aqueous solution of an acid) is preferable.

The acid that is contained in the acid treatment solution may be nitric acid, sulfuric acid, or hydrochloric acid, for example, without any specific limitations. One of these acids may be used individually, or two or more of these acids may be used in combination. Of these acids, nitric acid and sulfuric acid are preferable.

The time for which the feedstock CNTs are immersed in the acid treatment solution (immersion time) is preferably 1 minute or more, more preferably 10 minutes or more, even more preferably 30 minutes or more, and particularly preferably 50 minutes or more, and is preferably 120 minutes or less, more preferably 100 minutes or less, and even more preferably 80 minutes or less. The surface acid content of the surface-treated CNTs can be increased when the immersion time is 1 minute or more, whereas the surface acid content of the surface-treated CNTs does not excessively increase and production efficiency of the surface-treated CNTs is sufficiently ensured when the immersion time is 120 minutes or less.

The temperature when the feedstock CNTs are immersed in the acid treatment solution (immersion temperature) is preferably 20° C. or higher, and more preferably 40° C. or higher, and is preferably 80° ° C. or lower, and more preferably 70° C. or lower. When the immersion temperature is within any of the ranges set forth above, the surface acid content of the obtained surface-treated CNTs can be increased to a suitable degree.

After this immersion, the CNTs that have undergone the acid treatment step (acid-treated CNTs) can be collected from a mixture of the acid-treated CNTs and the acid treatment solution by a known technique such as filtration. The acid-treated CNTs that are collected may then be washed with water as necessary.

—Base Treatment Step—

In the base treatment step, the acid-treated CNTs that have been obtained through the acid treatment step described above are subjected to base treatment.

Although no specific limitations are placed on the method of base treatment so long as a base can be brought into contact with the acid-treated CNTs, a method in which the acid-treated CNTs are immersed in a base treatment solution (aqueous solution of a base) is preferable.

The base contained in the base treatment solution may be lithium hydroxide, ammonium chloride, sodium bicarbonate, or sodium hydroxide, for example, without any specific limitations. One of these bases may be used individually, or two or more of these bases may be used in combination. Of these bases, lithium hydroxide and ammonium chloride are preferable, and lithium hydroxide is more preferable.

The time for which the acid-treated CNTs are immersed in the base treatment solution (immersion time) is preferably 10 minutes or more, more preferably 60 minutes or more, even more preferably 80 minutes or more, and particularly preferably 90 minutes or more, and is preferably 240 minutes or less, more preferably 200 minutes or less, and even more preferably 150 minutes or less. The surface base content of the surface-treated CNTs can be increased when the immersion time is 10 minutes or more, whereas the surface base content of the surface-treated CNTs does not excessively increase and production efficiency of the surface-treated CNTs is sufficiently ensured when the immersion time is 240 minutes or less.

The temperature when the acid-treated CNTs are immersed in the base treatment solution (immersion temperature) is preferably 10° C. or higher, and more preferably 20° C. or higher, and is preferably 40° C. or lower, and more preferably 27° C. or lower. When the immersion temperature is within any of the ranges set forth above, the surface base content of the obtained surface-treated CNTs can be increased to a suitable degree.

—Washing Step—

In the washing step, the feedstock CNTs that have been obtained through the acid treatment step and base treatment step described above (i.e., acid/base-treated CNTs) are washed. This washing can remove excess acid components and base components (particularly base components) attached to the surface of the acid/base-treated CNTs and makes it possible to obtain surface-treated CNTs having specific properties.

Although no specific limitations are placed on the method by which the acid/base-treated CNTs are washed, water washing is preferable. For example, the acid/base-treated CNTs may be collected from a mixture of the acid/base-treated CNTs and the base treatment solution by a known technique such as filtration and these acid/base-treated CNTs may be washed with water. In this washing, it is possible to estimate to what extent acid components and base components have been removed by measuring the electrical conductivity of water (washing water) that has been used to wash the acid/base-treated CNTs.

After the washing step described above, removal of surface-attached water by drying and the like may be performed as necessary to obtain the surface-treated CNTs.

Note that the surface acid content and the surface base content of the surface-treated CNTs can be adjusted by altering conditions of the acid treatment step, base treatment step, and washing step described above. For example, the surface acid content and the surface base content of the surface-treated CNTs can be adjusted by altering the types and concentrations of the acid and the base contained in the acid treatment solution and the base treatment solution that are used in the acid treatment step and the base treatment step, respectively. Moreover, the surface acid content of the surface-treated CNTs can be increased by increasing the immersion time in the acid treatment step, and the surface base content of the surface-treated CNTs can be increased by increasing the immersion time in the base treatment step. Also, the surface acid content and the surface base content (particularly the surface base content) can be adjusted by altering the extent to which washing is performed in the washing step.

<Other Conductive Material>

Any conductive material having a form other than a fibrous form (for example, a particulate or plate-like form), such as carbon black (for example, acetylene black, Ketjenblack® (Ketjenblack is a registered trademark in Japan, other countries, or both), or furnace black) or graphene, may be used as another conductive material without any specific limitations. Note that one other conductive material may be used individually, or two or more other conductive materials may be used in combination in a freely selected ratio.

<Binder Composition>

The presently disclosed binder composition that contains the previously described first polymer, the previously described second polymer, and the previously described organic solvent and that optionally contains a non-ionic surfactant and/or other components is used as a binder composition.

No specific limitations are placed on the quantitative ratio of the fibrous conductive material and the binder composition when the fibrous conductive material and the binder composition are mixed to obtain the conductive material dispersion liquid. For example, the fibrous conductive material and the binder composition may be mixed in a quantitative ratio such that the obtained conductive material dispersion liquid preferably contains not less than 5 parts by mass and not more than 40 parts by mass, in total, of the first polymer and the second polymer per 100 parts by mass of the fibrous conductive material, and more preferably contains not less than 10 parts by mass and not more than 30 parts by mass, in total, of the first polymer and the second polymer per 100 parts by mass of the fibrous conductive material.

<Production Method of Conductive Material Dispersion Liquid>

No specific limitations are placed on the method by which the conductive material dispersion liquid is produced. The conductive material dispersion liquid can be produced by mixing the fibrous conductive material and the binder composition using a known mixing device, for example. Another conductive material may also be mixed together with the fibrous conductive material and the binder composition in production of the conductive material dispersion liquid, and an organic solvent such as NMP may be further added in production of the conductive material dispersion liquid.

(Slurry for Electrochemical Device Electrode)

The presently disclosed slurry for an electrode is a composition that contains an electrode active material and the conductive material dispersion liquid set forth above. In other words, the presently disclosed slurry for an electrode contains at least an electrode active material, the previously described fibrous conductive material, the previously described first polymer, the previously described second polymer, and the previously described organic solvent. The presently disclosed slurry for an electrode preferably contains a fluoropolymer from a viewpoint of increasing peel strength of an electrode while also further improving cycle characteristics of an electrochemical device.

As a result of the presently disclosed slurry for an electrode containing the presently disclosed conductive material dispersion liquid, it is possible to cause an electrochemical device to display excellent cycle characteristics through an electrode that is formed using the slurry for an electrode.

Note that the fibrous conductive material, first polymer, and second polymer that are contained in the presently disclosed slurry for an electrode and the non-ionic surfactant that is optionally contained in the presently disclosed slurry for an electrode originate from the presently disclosed binder composition and conductive material dispersion liquid and that the preferred ratio thereof is the same as in the presently disclosed binder composition and conductive material dispersion liquid.

<Electrode Active Material>

The electrode active material (positive electrode active material or negative electrode active material) that is compounded in the slurry for an electrode can be any known electrode active material without any specific limitations.

For example, a positive electrode active material used in a lithium ion secondary battery may be a metal oxide that includes lithium (Li), but is not specifically limited thereto. The positive electrode active material is preferably a positive electrode active material that includes one or more selected from the group consisting of cobalt (Co), nickel (Ni), manganese (Mn), and iron (Fe) in addition to lithium (Li). Examples of such positive electrode active materials include lithium-containing cobalt oxide (LiCoO$_2$), lithium manganate (LiMn$_2$O$_4$), lithium-containing nickel oxide (LiNiO$_2$), a lithium-containing complex oxide of Co—Ni—Mn, a lithium-containing complex oxide of Ni—Mn—Al, a lithium-containing complex oxide of Ni—Co—Al, olivine-type lithium manganese phosphate (LiMnPO$_4$), olivine-type lithium iron phosphate (LiFePO$_4$), lithium-rich spinel compounds represented by Li$_{1+x}$Mn$_{2-x}$O$_4$ (0<x<2), Li[Ni$_{0.17}$Li$_{0.2}$Co$_{0.07}$Mn$_{0.56}$]O$_2$, and LiNi$_{0.5}$Mn$_{1.5}$O$_4$. Note that one positive electrode active material may be used individually, or two or more positive electrode active materials may be used in combination in a freely selected ratio.

The particle diameter of the electrode active material is not specifically limited and can be the same as that of a conventionally used electrode active material.

Moreover, the amount of the electrode active material in the slurry for an electrode is not specifically limited and can be set within a conventionally used range.

<Conductive Material Dispersion Liquid>

The presently disclosed conductive material dispersion liquid that contains at least the previously described fibrous conductive material, the previously described first polymer, the previously described second polymer, and the previously described organic solvent is used as a conductive material dispersion liquid.

<Fluoropolymer>

The fluoropolymer may be polyvinylidene fluoride (PVdF) or polyvinylidene fluoride-hexafluoropropylene (PVdF-HFP) copolymer, for example. One fluoropolymer may be used individually, or two or more fluoropolymers may be used in combination in a freely selected ratio. Of these fluoropolymers, polyvinylidene fluoride is preferable from a viewpoint of further increasing peel strength of an electrode while also even further improving cycle characteristics of an electrochemical device.

Note that from a viewpoint of further increasing peel strength of an electrode while also even further improving cycle characteristics of an electrochemical device, the content of the fluoropolymer in the slurry for an electrode is preferably 0.1 parts by mass or more, and more preferably 0.5 parts by mass or more per 100 parts by mass of the electrode active material, and is preferably 3 parts by mass or less, and more preferably 2 parts by mass or less per 100 parts by mass of the electrode active material.

<Production Method of Slurry for Electrode>

No specific limitations are placed on the method by which the slurry for an electrode is produced. The slurry for an electrode can be produced by mixing the electrode active material, the conductive material dispersion liquid, and optional components such as the fluoropolymer using a known mixing device, for example. Note that the slurry for an electrode can alternatively be produced without performing production via the conductive material dispersion liquid. For example, the slurry for an electrode may be produced by mixing the first polymer, the second polymer, the organic solvent, the electrode active material, and so forth all at once.

(Electrode for Electrochemical Device)

The presently disclosed electrode includes an electrode mixed material layer obtained using the presently disclosed slurry for an electrode set forth above. More specifically, the presently disclosed electrode normally includes the aforementioned electrode mixed material layer on a current collector. The presently disclosed electrode can cause an electrochemical device to display excellent cycle characteristics as a result of the electrode mixed material layer being formed from the presently disclosed slurry for an electrode set forth above.

The electrode mixed material layer is normally formed of a dried product of the presently disclosed slurry for an electrode set forth above. Moreover, the electrode mixed material layer contains at least the electrode active material, the fibrous conductive material, the first polymer, and the second polymer. It should be noted that components contained in the electrode mixed material layer are components that were contained in the presently disclosed slurry for an electrode and that the preferred ratio thereof is the same as the preferred ratio of these components in the presently disclosed slurry for an electrode.

<Current Collector>

The current collector is formed of a material having electrical conductivity and electrochemical durability. Any known current collector can be used as the current collector without any specific limitations. For example, a current collector that is formed of aluminum or an aluminum alloy can be used as a current collector included in a positive electrode of a lithium ion secondary battery. Moreover, aluminum and an aluminum alloy may be used in combination, or different types of aluminum alloys may be used in combination. Aluminum and aluminum alloys make excellent current collector materials due to having heat resistance and electrochemical stability.

<Production Method of Electrode>

No specific limitations are placed on the method by which the presently disclosed electrode is produced. For example, the presently disclosed electrode can be produced by applying the presently disclosed slurry for an electrode set forth above onto at least one side of the current collector and drying the slurry for an electrode to form an electrode mixed material layer. In more detail, this production method includes a step of applying the slurry for an electrode onto at least one side of the current collector (application step) and a step of drying the slurry for an electrode that has been applied onto at least one side of the current collector so as to form an electrode mixed material layer on the current collector (drying step).

<<Application Step>>

The slurry for an electrode may be applied onto the current collector by any commonly known method without any specific limitations. Specific examples of application methods that can be used include doctor blading, dip coating, reverse roll coating, direct roll coating, gravure coating, extrusion coating, and brush coating. In the application, the slurry for an electrode may be applied onto just one side of the current collector or may be applied onto both sides of the current collector. The thickness of the slurry coating on the current collector after application but before drying may be set as appropriate in accordance with the thickness of the electrode mixed material layer to be obtained after drying.

<<Drying Step>>

The slurry for an electrode on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry for an electrode on the current collector in this manner, an electrode mixed material layer can be formed on the current collector to thereby obtain an electrode that includes the current collector and the electrode mixed material layer.

After the drying step, the electrode mixed material layer may be further subjected to a pressing process, such as mold pressing or roll pressing. The pressing process enables good close adherence of the electrode mixed material layer to the current collector.

Furthermore, in a case in which the electrode mixed material layer contains a curable polymer, this polymer may be cured after formation of the electrode mixed material layer.

(Electrochemical Device)

The presently disclosed electrochemical device includes the presently disclosed electrode set forth above. Moreover, the presently disclosed electrochemical device has excellent device characteristics such as cycle characteristics as a result of including the presently disclosed electrode. Note that the presently disclosed electrochemical device may be a non-aqueous secondary battery, for example, and is preferably a lithium ion secondary battery.

The following describes the configuration of a lithium ion secondary battery as one example of the presently disclosed electrochemical device. This lithium ion secondary battery includes a positive electrode, a negative electrode, an electrolyte solution, and a separator. At least one of the positive electrode and the negative electrode is the presently disclosed electrode. In other words, the lithium ion secondary battery may be a lithium ion secondary battery in which the positive electrode is the presently disclosed electrode and the negative electrode is an electrode other than the presently disclosed electrode, may be a lithium ion secondary battery in which the positive electrode is an electrode other than the presently disclosed electrode and the negative electrode is the presently disclosed electrode, or may be a lithium ion secondary battery in which the positive electrode and the negative electrode are both the presently disclosed electrode.

<Electrode Other than Presently Disclosed Electrode>

Any known electrode can be used without any specific limitations as an electrode that does not correspond to the presently disclosed electrode.

<Electrolyte Solution>

The electrolyte solution is normally an organic electrolyte solution obtained by dissolving a supporting electrolyte in an organic solvent. The supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region, and a mixture of ethylene carbonate and ethyl methyl carbonate is more preferable.

The concentration of the electrolyte in the electrolyte solution can be adjusted as appropriate and is, for example, preferably 0.5 mass % to 15 mass %, more preferably 2 mass % to 13 mass %, and even more preferably 5 mass % to 10 mass %. Moreover, a known additive such as fluoroethylene carbonate or ethyl methyl sulfone may be added to the electrolyte solution.

<Separator>

Examples of separators that can be used include, but are not specifically limited to, those described in JP2012-204303A. Of these separators, a microporous membrane formed of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity.

<Production Method of Lithium Ion Secondary Battery>

The lithium ion secondary battery in accordance with the present disclosure can be produced by, for example, stacking the positive electrode and the negative electrode with the separator in-between, performing rolling, folding, or the like of the resultant laminate in accordance with the battery shape, as necessary, to place the laminate in a battery container, injecting the electrolyte solution into the battery container, and sealing the battery container.

In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer. Furthermore, in the case of a polymer that is a hydrogenated polymer obtained through hydrogenation of a polymerized product including aliphatic conjugated diene monomer units, the total proportional content of non-hydrogenated aliphatic conjugated diene monomer units and alkylene structural units that are hydrogenated aliphatic conjugated diene monomer units in the hydrogenated polymer is the same as the ratio (charging ratio) of an aliphatic conjugated diene monomer among all monomers used in polymerization of the polymerized product.

In the examples and comparative examples, various measurements and evaluations were performed by the following methods.

<Weight-Average Molecular Weight>

The weight-average molecular weight of a polymer (first polymer or second polymer) was measured by gel permeation chromatography (GPC). Specifically, the weight-average molecular weight was calculated as a standard substance-equivalent value by preparing a calibration curve for a standard substance using polystyrene. The measurement conditions were as follows.

<<Measurement Conditions>>

Column: TSKgel α-M×2 (7.8 mm (internal diameter)×30 cm×2 columns; produced by Tosoh Corporation)

Eluent: Dimethylformamide (50 mM lithium bromide, 10 mM phosphoric acid)

Flow rate: 0.5 mL/min

Sample concentration: approximately 0.5 g/L (solid content concentration)

Injection volume: 200 μL

Column temperature: 40° ° C.

Detector: Differential refractive index detector RI (HLC-8320 GPC RI Detector produced by Tosoh Corporation) Detector conditions: RI: Pol (+), Res (1.0 s)

Molecular weight marker: Standard Polystyrene Kit PStQuick K produced by Tosoh Corporation <Iodine Value>

The iodine value of a first polymer was measured in accordance with JIS K 6235.

<Contact Angle with Polyethylene Film>

Using a contact angle meter (produced by Kyowa Interface Science Co., Ltd.; product name: DMs-400), 3 μL of a binder composition having a solid content concentration of 15 mass % was dripped onto the surface of a polyethylene film (separator substrate made of polyethylene; produced by Asahi Kasei Corporation; product name: ND412; thickness: 12 μm), and the contact angle (angle formed by a tangent to the droplet of the binder composition and the surface of the polyethylene film) was measured 10 seconds after dripping. Note that this measurement was performed under a condition of 25° C.

<Haze>

Using a haze meter (product name: NDH7000SP; produced by Nippon Denshoku Industries Co., Ltd.; device conforming with JIS K 7136:2000), standard calibration was performed by loading NMP into a glass cell for liquid measurement, and then a binder composition having a solid content concentration of 15.0 mass % was loaded into a glass cell and was measured under a condition of 25° C.

<Surface Acid Content>

Approximately 1 g of measurement subject CNTs were precisely weighed, were then immersed in 100 mL of 0.01 mol dm-3 tetrabutylhydride (also referred to as "tetrabutylammonium hydroxide"; hereinafter, abbreviated as "TBA OH")/4-methyl-2-pentanone (MIBK) solution, and were stirred by a stirrer for 1 hour. Thereafter, centrifugal separation was performed, and the supernatant was filtered using a filter. Residual TBA OH in 50 mL of the resultant filtrate was quantitatively analyzed by performing non-aqueous coulometric titration with 0.01 mol dm-3 perchloric acid ($HClO_4$)/MIBK solution, and then the acid content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

<Surface Base Content>

Approximately 1 g of measurement subject CNTs were precisely weighed, were then immersed in 100 mL of 0.01 mol dm-3 $HClO_4$/MIBK solution, and were stirred by a stirrer for 1 hour. Thereafter, centrifugal separation was performed, and the supernatant was filtered using a filter. Residual $HClO_4$ in 50 mL of the resultant filtrate was quantitatively analyzed by performing non-aqueous coulometric titration with 0.01 mol dm-3 TBA OH/MIBK solution, and then the base content (mmol/g) per 1 g of CNTs was determined from the obtained value. Note that this analysis was performed using an automatic coulometric titrator (produced by Kyoto Electronics Manufacturing Co., Ltd.; product name: AT-700). Also note that this sequence of operations was performed under argon gas flow at room temperature.

<BET Specific Surface Area>

The BET specific surface area of CNTs was measured using a Belsorp-mini (produced by MicrotracBEL Corp.; conforming with ASTM D3037-81).

<Dispersibility>

The viscosity of a conductive material dispersion liquid was measured under conditions of a temperature of 25° C. and a shear rate of 0.1 s$^{-1}$ using a rheometer (MCR 302 produced by Anton Paar). The viscosity was used to evaluate dispersibility of the conductive material dispersion liquid by the following standard. A lower conductive material dispersion liquid viscosity at the same solid content concentration (or at an extremely close solid content concentration) indicates better dispersion of a fibrous conductive material such as CNTs.

- A: Viscosity of less than 300 Pa·s
- B: Viscosity of not less than 300 Pa·s and less than 500 Pa·s
- C: Viscosity of not less than 500 Pa·s and less than 700 Pa·s
- D: Viscosity of 700 Pa·s or more <Peel Strength>

A positive electrode for a lithium ion secondary battery was cut out as a rectangular shape of 100 mm in length and 10 mm in width to obtain a test specimen. The test specimen was placed with the surface at which a positive electrode mixed material layer was present facing downward, and cellophane tape (tape in accordance with JIS Z1522) was affixed to the surface of the positive electrode mixed material layer. One end of the current collector was pulled in a perpendicular direction at a pulling speed of 100 mm/min to peel off the current collector, and the stress during this peeling was measured (note that the cellophane tape was fixed to a test stage). Three measurements were performed in this manner, an average value of the measurements was determined and was taken to be the peel strength, and the peel strength was evaluated by the following standard. A larger value for the peel strength indicates stronger close adherence of the positive electrode mixed material layer to the current collector formed of aluminum foil.

- A: Peel strength of 25 N/m or more
- B: Peel strength of not less than 20 N/m and less than 25 N/m
- C: Peel strength of not less than 15 N/m and less than 20 N/m
- D: Peel strength of less than 15 N/m <Resistance (Penetration Resistance)>

A positive electrode for a lithium ion secondary battery was punched out as a circular shape of 12 mm in diameter, and then the thickness d (μm) of the punched out test specimen and the area S of the positive electrode mixed material layer were measured. The test specimen was sandwiched in a jig of a tensile compression tester (produced by Imada Seisakusho Co., Ltd.; product name: SV-301NA) and was pressed with a pressure of 20 MPa. A two-terminal type clip was connected to the jig, and a measurement cable was connected to an automatic polarization system (produced by Hokuto Denko Corporation; product name: HSV-110). A fixed current I (=10 mA) was passed through the jig for 10 minutes in chronopotentiometry mode, and the voltage V (V) at that time was measured. The resistance R (Ω) was calculated by Ohm's law (R=V/I) and then the volume resistivity ρ (Ω·cm) was calculated (ρ=R×S/d) so as to determine the volume resistivity ρ according to a penetration method. The volume resistivity ρ determined in this manner was evaluated in accordance with the following evaluation standard.

- A: Volume resistivity ρ of less than 15 Ω·cm
- B: Volume resistivity ρ of not less than 15 Ω·cm and less than 30 Ω·cm
- C: Volume resistivity ρ of not less than 30 Ω·cm and less than 45 Ω·cm
- D: Volume resistivity ρ of 45 Ω·cm or more <Cycle Characteristics>

A lithium ion secondary battery was left at rest at a temperature of 25° C. for 5 hours after injection of electrolyte solution. Next, the lithium ion secondary battery was charged to a cell voltage of 3.65 V by a 0.2 C constant-current method at a temperature of 25° C. and was then subjected to 12 hours of aging at a temperature of 60° C. The lithium ion secondary battery was subsequently discharged to a cell voltage of 3.00 V by a 0.2 C constant-current method at a temperature of 25° C. Thereafter, CC-CV charging (upper limit cell voltage 4.20 V) was performed by a 0.2 C constant-current method and CC discharging was performed to 3.00 V by a 0.2 C constant-current method. This charging and discharging at 0.2 C was repeated three times.

Thereafter, the lithium ion secondary battery was subjected to 100 cycles of a charge/discharge operation with a cell voltage of 4.20 V to 3.00 V and a charge/discharge rate of 1.0 C in an environment having a temperature of 25° C. The discharge capacity of the 1st cycle was defined as X1 and the discharge capacity of the 100th cycle was defined as X2. The discharge capacity X1 and the discharge capacity X2 were used to determine a capacity maintenance rate expressed by ΔC=(X2/X1)×100(%), which was then evaluated by the following standard. A larger value for the capacity maintenance rate AC indicates that the lithium ion secondary battery has better cycle characteristics.

- A: Capacity maintenance rate AC of 93% or more
- B: Capacity maintenance rate AC of not less than 90% and less than 93%
- C: Capacity maintenance rate AC of not less than 87% and less than 90%
- D: Capacity maintenance rate AC of less than 87%

Example 1

<Production of First Polymer (Polymer 1-1)>
[Polymerization (Preparation of Polymer Intermediate)]

A reactor was charged with 180 parts of deionized water, 25 parts of sodium dodecylbenzenesulfonate (emulsifier) aqueous solution of 10% in concentration, 36 parts of acrylonitrile as a nitrile group-containing monomer, and 0.8 parts of t-dodecyl mercaptan as a molecular weight modifier in this order. Gas inside of the reactor was purged three times with nitrogen, and then 64 parts of 1,3-butadiene was added as an aliphatic conjugated diene monomer. The reactor was held at 10° C. while 0.1 parts of cumene hydroperoxide (polymerization initiator) and 0.1 parts of ferrous sulfate were added and a polymerization reaction was continued under stirring. At the point at which the polymerization conversion rate reached 85%, 0.1 parts of hydroquinone aqueous solution of 10% in concentration (polymerization inhibitor) was added to stop the polymerization reaction. Next, residual monomer was removed at a water temperature of 80° C. to yield a latex of nitrile rubber. A portion of the obtained latex was added to an aqueous solution of magnesium sulfate in an amount of 12% relative to nitrile rubber content and was stirred therewith to coagulate the latex. Thereafter, filtration was performed while also performing washing with water, and the resultant coagulated material was vacuum dried at a temperature of 60° C. for 12 hours to obtain nitrile rubber that was an intermediate for a target polymer (i.e., a polymer intermediate).

[Metathesis of Polymer Intermediate]

Next, 9 parts of the obtained nitrile rubber was dissolved in 141 parts of monochlorobenzene and was loaded into a reactor. The reactor was heated to 80° C., and then 2 L of a monochlorobenzene solution containing bis(tricyclohexylphosphine)benzylidene ruthenium dichloride as a Grubbs' catalyst was added such that the amount of the Grubbs' catalyst was 0.25 parts relative to 100 parts of polymer. The inside of the reactor was then pressurized to 3.5 MPa with ethylene as a co-olefin, and a metathesis reaction of the nitrile rubber was performed with a stirring speed of 600 rpm. During the reaction, the temperature was maintained constant using a cooling coil connected to a temperature controller and a heat sensor.

[Hydrogenation of Metathesized Polymer Intermediate]

Next, the inside of the reactor was degassed three times with 0.7 MPa $H_2$ while continuing stirring. The temperature of the reactor was then raised to 130° C., and 1 L of a monochlorobenzene solution containing Wilkinson's catalyst and triphenylphosphine was added into the reactor. Note that the amount of the Wilkinson's catalyst was set as 0.075 parts and the amount of triphenylphosphine was set as 1 part relative to 100 parts of the metathesized polymer intermediate. Next, the temperature was raised to 138° C., and a polymer hydrogenation reaction was performed for 6 hours under a condition of a hydrogen pressure of 8.4 MPa to yield a hydrogenated polymer. After the reaction had ended, the reactor was charged with 0.2 parts of activated carbon having an average diameter of 15 μm and was stirred for 30 minutes. Thereafter, filtration was performed using a filter having a pore diameter of 5 μm to obtain a filtrate.

[Production of NMP Composition]

A mixture was obtained by sampling 50 parts (equivalent to 3 parts of solid content) of the hydrogenated polymer obtained as described above and mixing 17 parts of NMP therewith. Next, monochlorobenzene contained in the obtained mixture was completely evaporated under reduced pressure to obtain a 15% solution (NMP composition) of a polymer 1-1. The iodine value and weight-average molecular weight of the polymer 1-1 were measured. The results are shown in Table 1.

<Production of Second Polymer (Polymer 2-1)>

[Polymerization]

A reactor including a stirrer was supplied with 90 parts of deionized water and 0.5 parts of ammonium persulfate. The gas phase was purged with nitrogen gas, and the temperature was raised to 80° C. Meanwhile, a monomer composition was obtained in a separate vessel by mixing 40 parts of deionized water, 0.8 parts of sodium dodecylbenzenesulfonate as an emulsifier, 24.0 parts of methoxy polyethylene glycol #400 acrylate (AM-90G produced by Shin-Nakamura Chemical Co., Ltd.; corresponding to compound of formula (II) in which $R^1$ is a hydrogen atom, $R^2$ is a methyl group, and n=9) as a monomer (II), 6.0 parts of styrene as an aromatic monovinyl monomer, and 0.8 parts of t-dodecyl mercaptan as a molecular weight modifier. The monomer composition was continuously added into the reactor over 4 hours to perform polymerization. The reaction was carried out at 80° C. during the addition. Once the addition was complete, 0.5 parts of ammonium persulfate was added, a further 3 hours of stirring was performed at 80° C., and the reaction was ended to produce a water dispersion of a polymer 2-1.

[Production of NMP Composition]

A mixture was obtained by sampling 20 parts (equivalent to 4.6 parts of solid content) of the water dispersion of the polymer 2-1 obtained as described above and mixing 26.2 parts of NMP therewith. Next, water contained in the obtained mixture was completely evaporated under reduced pressure to obtain a 15% solution (NMP composition) of the polymer 2-1. The weight-average molecular weight of the polymer 2-1 was measured. The result is shown in Table 1.

<Production of Binder Composition for Positive Electrode>

A disper blade was used to perform 30 minutes of mixing of 70 parts (10.5 parts in terms of solid content of polymer 1-1) of the NMP composition of the first polymer (polymer 1-1) obtained as described above and 0.5 parts of polyoxyethylene monolaurate (product name: NONION L-4; produced by NOF Corporation) as a non-ionic surfactant at a rotation speed of 300 rpm while maintaining a mixing temperature of 25° C. Next, 30 parts (4.5 parts in terms of solid content of polymer 2-1) of the NMP composition of the second polymer (polymer 2-1) obtained as described above was added to the resultant premix, and a disper blade was used to perform 30 minutes of mixing at 300 rpm while maintaining a mixing temperature of 25° C. to obtain a binder composition. The contact angle with a polyethylene film and haze when set to a solid content concentration of 15.0 mass % were measured for the obtained binder composition. The results are shown in Table 1.

Note that the content of the non-ionic surfactant in the binder composition was 3.33 parts when the total mass of the first polymer and the second polymer was taken to be 100 parts. Moreover, the mixing ratio of the polymer 1-1 and the polymer 2-1 in the binder composition was polymer 1-1: polymer 2–1=70:30.

<Production of Surface-Treated CNTs>

Multi-walled carbon nanotubes (BET specific surface area: 250 $m^2/g$) that had been weighed out in an amount of 1 g were added to a mixed solution of 40 mL of concentrated nitric acid and 40 mL of 2 M sulfuric acid and were stirred for 1 hour while being kept at 60° C. (acid treatment). Thereafter, solid-liquid separation was performed by filtration using filter paper (Toyo Roshi Kaisha, Ltd.; Filter Paper No. 2, 125 mm). Solids on the filter paper were washed using 200 mL of purified water, and then CNT solids (acid-treated CNTs) were collected. These CNT solids were added into 200 mL of lithium hydroxide aqueous solution of 2.5 mol/L in concentration and were subsequently stirred for 2 hours while being kept at 25° C. in a water bath (base treatment). Thereafter, solid-liquid separation was performed by vacuum filtration using a membrane filter having a pore diameter of 10 μm. CNT solids (acid/base-treated CNTs) on the membrane filter were repeatedly washed using purified water. Once the electrical conductivity of washing water reached 50 μS/m or less, solid-liquid separation of the CNT solids was performed by the same method as described above. The obtained CNT solids were dried under reduced pressure at 50° C. for 8 hours to thereby produce surface-treated CNTs. The surface-treated CNTs had a surface acid content of 0.015 mmol/g, a surface base content of 0.05 mmol/g, and a BET specific surface area of 250 $m^2/g$. Moreover, the value of the ratio of surface acid content relative to surface base content was 0.3.

<Production of Conductive Material Dispersion Liquid>

A conductive material dispersion liquid having a solid content concentration of 3.6% was produced by using a disper blade to stir (3,000 rpm, 10 minutes) 3.0 parts of the surface-treated CNTs as a fibrous conductive material, 0.6 parts (in terms of solid content) of the binder composition, and 96.4 parts of NMP and subsequently using a bead mill in which zirconia beads of 1 mm in diameter were used to perform 1 hour of mixing at a circumferential speed of 8 m/s.

Dispersibility was evaluated for this conductive material dispersion liquid. The result is shown in Table 1.
<Production of Slurry for Positive Electrode>

A slurry for a positive electrode was produced by stirring 0.04 parts (total amount of solid content of first polymer and second polymer) of the conductive material dispersion liquid obtained as described above, 100 parts of a ternary active material having a layered structure ($LiNi_{0.5}Co_{0.2}Mn_{0.3}O_2$; volume-average particle diameter: 10 μm) as a positive electrode active material, 0.96 parts of PVdF as a fluoropolymer, and NMP as an organic solvent in a planetary mixer (60 rpm, 30 minutes). Note that the additive amount of NMP was adjusted such that the viscosity of the obtained slurry composition for a positive electrode (measured by single-cylinder rotational viscometer in accordance with JIS Z8803: 1991; temperature: 25° C.; rotation speed: 60 rpm) was within a range of 4,000 mPa·s to 5,000 mPa·s.
<Production of Positive Electrode>

Aluminum foil of 20 μm in thickness was prepared as a current collector. The slurry for a positive electrode obtained as described above was applied onto one side of the aluminum foil by a comma coater such as to have a coating weight after drying of 20 mg/cm², was dried at 90° ° C. for 20 minutes and at 120° C. for 20 minutes, and was then heat treated at 60° C. for 10 hours to obtain a positive electrode web. This positive electrode web was rolled by roll pressing to produce a sheet-shaped positive electrode including the aluminum foil and a positive electrode mixed material layer (density: 3.2 g/cm³). The sheet-shaped positive electrode was cut to 48.0 mm in width and 47 cm in length to obtain a positive electrode for a lithium ion secondary battery. Peel strength and resistance were evaluated for this positive electrode. The results are shown in Table 1.
<Production of Negative Electrode>

A slurry for a negative electrode was produced by stirring a mixture of 90 parts of spherical artificial graphite (volume-average particle diameter: 12 μm) and 10 parts of $SiO_x$ (volume-average particle diameter: 10 μm) as a negative electrode active material, 1 part of a styrene butadiene polymer as a binder for a negative electrode, 1 part of carboxymethyl cellulose as a thickener, and an appropriate amount of water as a dispersion medium in a planetary mixer.

Next, copper foil of 15 μm in thickness was prepared as a current collector. The slurry for a negative electrode obtained as described above was applied onto one side of the copper foil such as to have a coating weight after drying of 10 mg/cm² and was then dried at 60° ° C. for 20 minutes and at 120° C. for 20 minutes. Thereafter, 2 hours of heat treatment was performed at 150° C. to obtain a negative electrode web. The negative electrode web was rolled by roll pressing to produce a sheet-shaped negative electrode including the copper foil and a negative electrode mixed material layer of 1.6 g/cm³ in density. The sheet-shaped negative electrode was cut to 50.0 mm in width and 52 cm in length to obtain a negative electrode for a lithium ion secondary battery.
<Production of Lithium Ion Secondary Battery>

The positive electrode and negative electrode produced as described above were wound up with the respective electrode mixed material layers thereof facing each other and with a separator (microporous membrane made of polypropylene) of 15 μm in thickness interposed therebetween using a core of 20 mm in diameter so as to obtain a roll. The obtained roll was compressed to a thickness of 4.5 mm from one direction at a rate of 10 mm/s. Note that the compressed roll had an elliptical shape in plan view, and the ratio of the major axis to the minor axis (major axis/minor axis) was 7.7.

In addition, an electrolyte solution ($LiPF_6$ solution of 1.0 M in concentration (solvent: mixed solution in which 5 mass % of fluoroethylene carbonate was added to mixed solvent of ethylene carbonate/ethyl methyl carbonate=3/7 (mass ratio); additive: 2 volume % of vinylene carbonate)) was prepared.

Thereafter, the compressed roll was housed inside a laminate case made of aluminum together with 3.2 g of the electrolyte solution. After connecting a nickel lead at a specific location on the negative electrode for a lithium ion secondary battery and connecting an aluminum lead at a specific location on the positive electrode for a lithium ion secondary battery, an opening of the case was heat sealed to obtain a lithium ion secondary battery. This lithium ion secondary battery had a pouch shape of 35 mm in width, 60 mm in height, and 5 mm in thickness. The nominal capacity of the battery was 700 mAh.

Cycle characteristics were evaluated for the obtained lithium ion secondary battery. The result is shown in Table 1.

Examples 2 and 3

A first polymer, a second polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the amounts of methoxy polyethylene glycol #400 acrylate (AM-90G) and styrene were changed as indicated below in production of the second polymer. The results are shown in Table 1.

Example 2 (polymer 2-2): 22.5 parts of AM-90G and 7.5 parts of styrene (75:25)

Example 3 (polymer 2-3): 25.5 parts of AM-90G and 4.5 parts of styrene (85:15)

Examples 4, 5, 9, and 10

A first polymer, a second polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the additive amounts of NMP compositions were changed in production of the binder composition for a positive electrode so as to change the amounts in terms of solid content of the polymer 1-1 and the polymer 2-1 as indicated below. The results are shown in Tables 1 and 2.

Example 4: 12 parts of 1-1 and 3 parts of 2-1 (80:20)
Example 5: 9 parts of 1-1 and 6 parts of 2-1 (60:40)
Example 9: 14.25 parts of 1-1 and 0.75 parts of 2-1 (95:5)
Example 10: 7.5 parts of 1-1 and 7.5 parts of 2-1 (50:50)

Examples 6, 7, and 15

A first polymer, a second polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the mixing temperature was changed to 45° C.

(Example 6), 15° C. (Example 7), or 70° C. (Example 15) in production of the binder composition for a positive electrode. The results are shown in Tables 1 and 2.

Example 8

A second polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that a polymer 1-2 produced as described below was used instead of the polymer 1-1 as a first polymer. The results are shown in Table 1.
<Production of First Polymer (Polymer 1-2)>
Nitrile rubber that was a polymer intermediate was obtained in the same way as in Example 1. With the exception that metathesis of the polymer intermediate was not performed, hydrogenation was then performed by the same procedure as in Example 1 to obtain a 15% solution (NMP composition) of a polymer 1-2.

Example 11

A first polymer, a second polymer, a conductive material dispersion liquid, surface-treated CNTs, a slurry for a positive electrode, a positive electrode, a negative electrode, and a lithium ion secondary battery were produced and various evaluations were performed in the same way as in Example 1 with the exception that a binder composition for a positive electrode obtained as described below was used. The results are shown in Table 2.
<Production of Binder Composition for Positive Electrode>
A binder composition was obtained by using a disper blade to perform 30 minutes of mixing of 70 parts (10.5 parts in terms of solid content of polymer 1-1) of the NMP composition of the first polymer (polymer 1-1), 0.5 parts of polyoxyethylene monolaurate (product name: NONION L-4; produced by NOF Corporation) as a non-ionic surfactant, and 30 parts (4.5 parts in terms of solid content of polymer 2-1) of the NMP composition of the second polymer (polymer 2-1) at a rotation speed of 300 rpm while maintaining a mixing temperature of 25° C.

Example 12

A first polymer, a second polymer, a conductive material dispersion liquid, surface-treated CNTs, a slurry for a positive electrode, a positive electrode, a negative electrode, and a lithium ion secondary battery were produced and various evaluations were performed in the same way as in Example 1 with the exception that a binder composition for a positive electrode obtained as described below was used. The results are shown in Table 2.
<Production of Binder Composition for Positive Electrode>
A disper blade was used to perform 30 minutes of mixing of 70 parts (10.5 parts in terms of solid content of polymer 1-1) of the NMP composition of the first polymer (polymer 1-1) and 30 parts (4.5 parts in terms of solid content of polymer 2-1) of the NMP composition of the second polymer (polymer 2-1) at a rotation speed of 300 rpm while maintaining a mixing temperature of 25° C. Next, 0.5 parts of polyoxyethylene monolaurate (product name: NONION L-4; produced by NOF Corporation) as a non-ionic surfactant was added to the resultant premix, and a disper blade was used to perform 30 minutes of mixing at 300 rpm while maintaining a mixing temperature of 25° C. to obtain a binder composition.

Example 13

A first polymer, a second polymer, a conductive material dispersion liquid, surface-treated CNTs, a slurry for a positive electrode, a positive electrode, a negative electrode, and a lithium ion secondary battery were produced and various evaluations were performed in the same way as in Example 1 with the exception that a binder composition for a positive electrode obtained as described below was used. The results are shown in Table 2.
<Production of Binder Composition for Positive Electrode>
A binder composition was obtained by using a disper blade to perform 30 minutes of mixing of 70 parts (10.5 parts in terms of solid content of polymer 1-1) of the NMP composition of the first polymer (polymer 1-1) and 30 parts (4.5 parts in terms of solid content of polymer 2-1) of the NMP composition of the second polymer (polymer 2-1) at a rotation speed of 300 rpm while maintaining a mixing temperature of 25° C.

Example 14

A first polymer, a second polymer, a binder composition for a positive electrode, a conductive material dispersion liquid, surface-treated CNTs, a slurry for a positive electrode, a positive electrode, a negative electrode, and a lithium ion secondary battery were produced and various evaluations were performed in the same way as in Example 1 with the exception that the amount of polyoxyethylene monolaurate as a non-ionic surfactant was changed to 8 parts in production of the binder composition for a positive electrode. The results are shown in Table 2.

Note that the content of the non-ionic surfactant in the binder composition was 53.3 parts when the total mass of the first polymer and the second polymer was taken to be 100 parts.

Comparative Examples 1 and 2

A first polymer, a second polymer, a binder composition for a positive electrode, surface-treated CNTs, a conductive material dispersion liquid, a slurry for a positive electrode, a positive electrode, a negative electrode, and a lithium ion secondary battery were produced and various evaluations were performed in the same way as in Example 1 with the exception that the amounts of methoxy polyethylene glycol #400 acrylate (AM-90G) and styrene were changed as indicated below in production of the second polymer. The results are shown in Table 2.

Comparative Example 1 (polymer 2-4): 15.0 parts of AM-90G and 15.0 parts of styrene (50:50)

Comparative Example 2 (polymer 2-5): 28.8 parts of AM-90G and 1.2 parts of styrene (96:4)

Note that in Tables 1 and 2, shown below:

"AN" indicates acrylonitrile unit;

"Mw" indicates weight-average molecular weight;

"AM-90G" indicates structural unit derived from AM-90G (methoxy polyethylene glycol #400 acrylate);

"St" indicates styrene unit;

"L-4" indicates NONION L-4 (polyoxyethylene monolaurate);

"1→NS→2" indicates procedure in which first polymer and non-ionic surfactant are mixed and then resultant premix and second polymer are mixed;

"Mixing all at once" indicates procedure in which first polymer, non-ionic surfactant, and second polymer are mixed all at once;

"1→2→NS" indicates procedure in which first polymer and second polymer are mixed and then resultant premix and non-ionic surfactant are mixed;

"1→2" indicates procedure in which first polymer and second polymer are mixed without using non-ionic surfactant; and "First: Second (mixing ratio)" indicates mixing ratio (by mass) of first polymer and second polymer.

TABLE 1

|  |  |  |  | Example 1 | Example 2 | Example 3 | Example 4 | Example 5 | Example 6 | Example 7 | Example 8 |
|---|---|---|---|---|---|---|---|---|---|---|---|
| Binder composition | First polymer | Type | | 1-1 | 1-1 | 1-1 | 1-1 | 1-1 | 1-1 | 1-1 | 1-2 |
|  |  | Nitrile group-containing monomer unit | Type | AN | AN | AN | AN | AN | AN | AN | AN |
|  |  |  | Proportion [mass %] | 36 | 36 | 36 | 36 | 36 | 36 | 36 | 36 |
|  |  | Iodine value [mg/100 mg] | | 5 | 5 | 5 | 5 | 5 | 5 | 5 | 5 |
|  |  | Mw [—] | | 25,000 | 25,000 | 25,000 | 25,000 | 25,000 | 25,000 | 25,000 | 120,000 |
|  | Second polymer | Type | | 2-1 | 2-2 | 2-3 | 2-1 | 2-1 | 2-1 | 2-1 | 2-1 |
|  |  | Structural unit (I) | Type | AM-90G | AM-90G | AM-90G | AM-90G | AM-90G | AM-90G | AM-90G | AM-90G |
|  |  |  | Proportion [mass %] | 80 | 75 | 85 | 80 | 80 | 80 | 80 | 80 |
|  |  | Aromatic monovinyl monomer unit | Type | St | St | St | St | St | St | St | St |
|  |  |  | Proportion [mass %] | 20 | 25 | 15 | 20 | 20 | 20 | 20 | 20 |
|  |  | Mw [—] | | 25,000 | 25,000 | 25,000 | 25,000 | 25,000 | 25,000 | 25,000 | 25,000 |
|  | Non-ionic surfactant | Type | | L-4 | L-4 | L-4 | L-4 | L-4 | L-4 | L-4 | L-4 |
|  |  | Amount (parts by mass) | | 3.33 | 3.33 | 3.33 | 3.33 | 3.33 | 3.33 | 3.33 | 3.33 |
| Production method | Mixing order | | | 1→NS→2 | 1→NS→2 | 1→NS→2 | 1→NS→2 | 1→NS→2 | 1→NS→2 | 1→NS→2 | 1→NS→2 |
|  | Mixing temperature [° C.] | | | 25 | 25 | 25 | 25 | 25 | 45 | 15 | 25 |
| Contact angle [°] | | | | 45 | 45 | 45 | 45 | 45 | 55 | 35 | 45 |
| Haze [%] | | | | 15 | 15 | 15 | 15 | 15 | 15 | 15 | 15 |
| First:Second (mixing ratio) | | | | 70:30 | 70:30 | 70:30 | 80:20 | 60:40 | 70:30 | 70:30 | 70:30 |
| Dispersibility | | | | A | A | B | A | B | A | A | B |
| Peel strength | | | | A | A | A | A | A | B | A | A |
| Resistance | | | | A | A | A | A | A | A | B | A |
| Cycle characteristics | | | | A | B | A | B | A | A | A | A |

TABLE 2

|  |  |  |  | Example 9 | Example 10 | Example 11 | Example 12 | Example 13 | Example 14 | Example 15 | Comparative Example 1 | Comparative Example 2 |
|---|---|---|---|---|---|---|---|---|---|---|---|---|
| Binder composition | First polymer | Type | | 1-1 | 1-1 | 1-1 | 1-1 | 1-1 | 1-1 | 1-1 | 1-1 | 1-1 |
|  |  | Nitrile group-containing monomer unit | Type | AN | AN | AN | AN | AN | AN | AN | AN | AN |
|  |  |  | Proportion [mass %] | 36 | 36 | 36 | 36 | 36 | 36 | 36 | 36 | 36 |
|  |  | Iodine value [mg/100 mg] | | 5 | 5 | 5 | 5 | 5 | 5 | 5 | 5 | 5 |
|  |  | Mw [—] | | 25,000 | 25,000 | 25,000 | 25,000 | 25,000 | 25,000 | 25,000 | 25,000 | 25,000 |
|  | Second polymer | Type | | 2-1 | 2-1 | 2-1 | 2-1 | 2-1 | 2-1 | 2-1 | 2-4 | 2-5 |
|  |  | Structural unit (I) | Type | AM-90G | AM-90G | AM-90G | AM-90G | AM-90G | AM-90G | AM-90G | AM-90G | AM-90G |
|  |  |  | Proportion [mass %] | 80 | 80 | 80 | 80 | 80 | 80 | 80 | 50 | 96 |
|  |  | Aromatic monovinyl monomer unit | Type | St | St | St | St | St | St | St | St | St |
|  |  |  | Proportion [mass %] | 20 | 20 | 20 | 20 | 20 | 20 | 20 | 50 | 4 |
|  |  | Mw [—] | | 25,000 | 25,000 | 25,000 | 25,000 | 25,000 | 25,000 | 25,000 | 25,000 | 25,000 |
|  | Non-ionic surfactant | Type | | L-4 | L-4 | L-4 | L-4 | — | L-4 | L-4 | L-4 | L-4 |
|  |  | Amount | | 3.33 | 3.33 | 3.33 | 3.33 | — | 53.3 | 3.33 | 3.33 | 3.33 |

TABLE 2-continued

|  |  | Example 9 | Example 10 | Example 11 | Example 12 | Example 13 | Example 14 | Example 15 | Comparative Example 1 | Comparative Example 2 |
|---|---|---|---|---|---|---|---|---|---|---|
| Production method | (parts by mass) Mixing order | 1→NS→2 | 1→NS→2 | Mixing all at once | 1→2→NS | 1→2 | 1→NS→2 | 1→NS→2 | 1→NS→2 | 1→NS→2 |
|  | Mixing temperature [° C.] | 25 | 25 | 25 | 25 | 25 | 25 | 70 | 25 | 25 |
|  | Contact angle [°] | 45 | 50 | 45 | 45 | 45 | 55 | 70 | 50 | 40 |
|  | Haze [%] | 15 | 15 | 50 | 40 | 60 | 10 | 15 | 15 | 15 |
|  | First:Second (mixing ratio) | 95:5 | 50:50 | 70:30 | 70:30 | 70:30 | 70:30 | 70:30 | 70:30 | 70:30 |
|  | Dispersibility | B | C | C | B | C | A | C | A | D |
|  | Peel strength | A | A | A | A | A | C | C | A | B |
|  | Resistance | A | A | C | B | C | B | A | A | B |
|  | Cycle characteristics | C | A | B | A | B | A | B | D | B |

It can be seen from Tables 1 and 2 that it is possible to produce a conductive material dispersion liquid that has excellent dispersibility and a positive electrode that can cause an electrochemical device to display excellent cycle characteristics through the binder compositions of Examples 1 to 15, which each contain a specific first polymer, a specific second polymer, and an organic solvent.

INDUSTRIAL APPLICABILITY

According to the present disclosure, it is possible to provide a binder composition for an electrochemical device that is capable of producing a conductive material dispersion liquid having excellent dispersibility and that can cause an electrochemical device to display excellent cycle characteristics.

Moreover, according to the present disclosure, it is possible to provide a conductive material dispersion liquid for an electrochemical device that has excellent dispersibility and can cause an electrochemical device to display excellent cycle characteristics.

Furthermore, according to the present disclosure, it is possible to provide a slurry for an electrochemical device electrode that can cause an electrochemical device to display excellent cycle characteristics.

Also, according to the present disclosure, it is possible to provide an electrochemical device having excellent cycle characteristics.

The invention claimed is:

1. A binder composition for an electrochemical device comprising a first polymer, a second polymer, an organic solvent, and a non-ionic surfactant wherein
the first polymer includes a nitrile group-containing monomer unit and includes either or both of an aliphatic conjugated diene monomer unit and an alkylene structural unit,
the second polymer includes, in a proportion of not less than 70 mass % and not more than 95 mass % when all structural units in the second polymer are taken to be 100 mass %, a structural unit indicated by formula (I), shown below,

[Chem. 1]

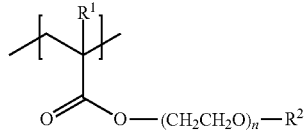

where, in formula (I), $R^1$ represents a hydrogen atom or a methyl group, $R^2$ represents a hydrogen atom, a phenyl group, an alkyl group having a carbon number of not less than 1 and not more than 6, or a phenyl group including not fewer than one and not more than three alkyl groups having a carbon number of not less than 1 and not more than 6, and n represents an integer of 3 or more, and
the non-ionic surfactant is at least one selected from the group consisting of polyoxyethylene monolaurate, polyoxyethylene monostearate and polyoxyethylene monooleate.

2. The binder composition for an electrochemical device according to claim 1, wherein the second polymer further includes an aromatic monovinyl monomer unit.

3. The binder composition for an electrochemical device according to claim 2, wherein the second polymer includes the aromatic monovinyl monomer unit in a proportion of not less than 5 mass % and not more than 30 mass % when all structural units in the second polymer are taken to be 100 mass %.

4. The binder composition for an electrochemical device according to claim 1, wherein a proportion constituted by mass of the second polymer among total mass of the first polymer and the second polymer is not less than 10 mass % and not more than 40 mass %.

5. The binder composition for an electrochemical device according to claim 1, wherein the organic solvent is N-methyl-2-pyrrolidone.

6. The binder composition for an electrochemical device according to claim 1, having a contact angle with a polyethylene film of not less than 30° and not more than 60° when set to a solid content concentration of 15.0 mass %.

7. The binder composition for an electrochemical device according to claim 1, having a haze of 45% or less when set to a solid content concentration of 15.0 mass %.

8. The binder composition for an electrochemical device according to claim 1, wherein the first polymer has a weight-average molecular weight of not less than 20,000 g/mol and not more than 250,000 g/mol.

9. A conductive material dispersion liquid for an electrochemical device comprising: the binder composition for an electrochemical device according to claim 1; and a fibrous conductive material.

10. A slurry for an electrochemical device electrode comprising: the conductive material dispersion liquid for an electrochemical device according to claim 9; and an electrode active material.

11. The slurry for an electrochemical device electrode according to claim 10, further comprising a fluoropolymer.

12. An electrode for an electrochemical device comprising an electrode mixed material layer formed using the slurry for an electrochemical device electrode according to claim 10.

13. An electrochemical device comprising the electrode for an electrochemical device according to claim 12.

14. The binder composition for an electrochemical device according to claim 1, wherein the non-ionic surfactant is polyoxyethylene monolaurate.

* * * * *